(12) United States Patent
Donovan et al.

(10) Patent No.: US 10,803,766 B1
(45) Date of Patent: Oct. 13, 2020

(54) MODULAR TRAINING OF NETWORK-BASED TRAINING EXERCISES

(71) Applicant: Architecture Technology Corporation, Minneapolis, MN (US)

(72) Inventors: Matthew P. Donovan, Trumansburg, NY (US); Tyler J. Mitchell, Ithaca, NY (US); Dahyun Hollister, Ithaca, NY (US)

(73) Assignee: ARCHITECTURE TECHNOLOGY CORPORATION, Minneapolis, MN (US)

( * ) Notice: Subject to any disclaimer, the term of this patent is extended or adjusted under 35 U.S.C. 154(b) by 147 days.

(21) Appl. No.: 15/712,057

(22) Filed: Sep. 21, 2017

Related U.S. Application Data

(63) Continuation-in-part of application No. 14/811,403, filed on Jul. 28, 2015, now Pat. No. 10,083,624.

(51) Int. Cl.
*G09B 19/00* (2006.01)
*G09B 5/12* (2006.01)
(Continued)

(52) U.S. Cl.
CPC ..... *G09B 19/0053* (2013.01); *G06F 9/45558* (2013.01); *G09B 5/12* (2013.01);
(Continued)

(58) Field of Classification Search
CPC .. G09B 19/0053; H04L 41/145; G06F 21/577
See application file for complete search history.

(56) References Cited

U.S. PATENT DOCUMENTS 4,895,518 A 1/1990 Arnold et al.
5,440,723 A 8/1995 Arnold et al.
(Continued)

FOREIGN PATENT DOCUMENTS

WO 02071192 A2 9/2002

OTHER PUBLICATIONS

Final Office Action from U.S. Appl. No. 14/811,403, dated Jan. 8, 2018, 13 pp.
(Continued)

*Primary Examiner* — Peter R Egloff
(74) *Attorney, Agent, or Firm* — Shumaker & Sieffert, P.A.

(57) ABSTRACT

An example method includes deploying, by a modular training system and on one or more virtual machines in a network, one or more training environments that are configured to execute one or more training exercises; deploying, by the modular training system and for execution by one or more remote host computing systems that are communicatively coupled to the network, one or more software agents that are executed during the one or more training exercises, wherein the one or more software agents are configured to collect parameter data from the one or more remote host computing systems while the one or more trainees perform actions during the training exercise; and receiving, by the modular training system and from the one or more remote host computing system via the network, the parameter data collected by the one or more software agents during execution of the one or more training exercises.

19 Claims, 14 Drawing Sheets

(51) Int. Cl.
*G09B 7/00* (2006.01)
*G06F 9/455* (2018.01)
*H04L 29/08* (2006.01)

(52) U.S. Cl.
CPC ........ *G09B 7/00* (2013.01); *G06F 2009/4557* (2013.01); *G06F 2009/45595* (2013.01); *H04L 67/10* (2013.01)

(56) References Cited

U.S. PATENT DOCUMENTS

| | | | |
|---|---|---|---|
| 5,601,432 | A | 2/1997 | Bergman |
| 5,944,783 | A | 8/1999 | Nieten |
| 6,345,283 | B1 | 2/2002 | Anderson |
| 7,058,968 | B2 | 6/2006 | Rowland et al. |
| 7,107,347 | B1 | 9/2006 | Cohen |
| 7,228,566 | B2 | 6/2007 | Caceres et al. |
| 7,234,168 | B2 | 6/2007 | Gupta et al. |
| 7,325,252 | B2 | 1/2008 | Bunker et al. |
| 7,372,809 | B2 | 5/2008 | Chen et al. |
| 7,496,959 | B2 | 2/2009 | Adelstein et al. |
| 7,522,908 | B2 | 4/2009 | Hrastar |
| 7,694,328 | B2 | 4/2010 | Joshi et al. |
| 7,748,040 | B2 | 6/2010 | Adelstein et al. |
| 7,818,804 | B2 | 10/2010 | Marceau |
| 7,886,049 | B2 | 2/2011 | Adelstein et al. |
| 7,925,984 | B2 | 4/2011 | Awe et al. |
| 7,930,353 | B2 | 4/2011 | Chickering et al. |
| 8,079,080 | B2 | 12/2011 | Borders |
| 8,176,557 | B2 | 5/2012 | Adelstein et al. |
| 8,250,654 | B1 | 8/2012 | Kennedy et al. |
| 8,266,320 | B1 | 9/2012 | Bell et al. |
| 8,307,444 | B1 | 11/2012 | Mayer et al. |
| 8,321,437 | B2 | 11/2012 | Lim |
| 8,341,732 | B2 | 12/2012 | Croft et al. |
| 8,406,682 | B2 * | 3/2013 | Elesseily ............... G06Q 10/06 434/362 |
| 8,407,801 | B2 | 3/2013 | Ikegami et al. |
| 8,433,768 | B1 | 4/2013 | Bush et al. |
| 8,490,193 | B2 | 7/2013 | Sarraute Yamada et al. |
| 8,495,229 | B2 | 7/2013 | Kim |
| 8,554,536 | B2 | 10/2013 | Adelman et al. |
| 9,076,342 | B2 | 7/2015 | Brueckner et al. |
| 9,384,677 | B2 | 7/2016 | Brueckner et al. |
| 10,026,509 | B2 | 7/2018 | Powers et al. |
| 10,057,298 | B2 | 8/2018 | Bronner et al. |
| 10,067,787 | B2 | 9/2018 | Bronner et al. |
| 10,068,493 | B2 | 9/2018 | Brueckner et al. |
| 2002/0073204 | A1 | 6/2002 | Dutta et al. |
| 2002/0078382 | A1 | 6/2002 | Sheikh et al. |
| 2002/0129264 | A1 | 9/2002 | Rowland et al. |
| 2002/0162017 | A1 | 10/2002 | Sorkin et al. |
| 2003/0056116 | A1 | 3/2003 | Bunker et al. |
| 2003/0182582 | A1 | 9/2003 | Park et al. |
| 2003/0236993 | A1 | 12/2003 | McCreight et al. |
| 2004/0039921 | A1 | 2/2004 | Chuang |
| 2005/0132225 | A1 | 6/2005 | Gearhart |
| 2005/0165834 | A1 | 7/2005 | Nadeau et al. |
| 2005/0193173 | A1 | 9/2005 | Ring et al. |
| 2005/0193430 | A1 | 9/2005 | Cohen et al. |
| 2005/0203921 | A1 | 9/2005 | Newman et al. |
| 2006/0037076 | A1 | 2/2006 | Roy |
| 2006/0104288 | A1 | 5/2006 | Yim et al. |
| 2006/0109793 | A1 | 5/2006 | Kim et al. |
| 2006/0167855 | A1 | 7/2006 | Ishikawa et al. |
| 2006/0248525 | A1 | 11/2006 | Hopkins |
| 2006/0253906 | A1 | 11/2006 | Rubin et al. |
| 2007/0055766 | A1 | 3/2007 | Petropoulakis et al. |
| 2007/0112714 | A1 | 5/2007 | Fairweather |
| 2007/0192863 | A1 | 8/2007 | Kapoor et al. |
| 2008/0010225 | A1 | 1/2008 | Gonsalves et al. |
| 2008/0167920 | A1 | 7/2008 | Schmidt et al. |
| 2008/0183520 | A1 | 7/2008 | Cutts et al. |
| 2008/0222734 | A1 | 9/2008 | Redlich et al. |
| 2009/0007270 | A1 | 1/2009 | Futoransky et al. |
| 2009/0144827 | A1 | 6/2009 | Peinado et al. |
| 2009/0150998 | A1 | 6/2009 | Adelstein et al. |
| 2009/0158430 | A1 | 6/2009 | Borders |
| 2009/0164522 | A1 | 6/2009 | Fahey |
| 2009/0208910 | A1 | 8/2009 | Brueckner et al. |
| 2009/0254572 | A1 | 10/2009 | Redlich et al. |
| 2009/0288164 | A1 | 11/2009 | Adelstein et al. |
| 2009/0319247 | A1 | 12/2009 | Ratcliffe, III et al. |
| 2009/0319249 | A1 | 12/2009 | White et al. |
| 2009/0319647 | A1 | 12/2009 | White et al. |
| 2009/0319906 | A1 | 12/2009 | White et al. |
| 2009/0320137 | A1 | 12/2009 | White et al. |
| 2009/0328033 | A1 | 12/2009 | Kohavi et al. |
| 2010/0010968 | A1 | 1/2010 | Redlich et al. |
| 2010/0058114 | A1 | 3/2010 | Perkins et al. |
| 2010/0146615 | A1 | 6/2010 | Locasto et al. |
| 2010/0319069 | A1 | 12/2010 | Granstedt et al. |
| 2011/0154471 | A1 | 6/2011 | Anderson et al. |
| 2011/0177480 | A1 | 7/2011 | Menon et al. |
| 2012/0210427 | A1 | 8/2012 | Bronner et al. |
| 2013/0347085 | A1 | 12/2013 | Hawthorn et al. |
| 2013/0347116 | A1 | 12/2013 | Flores et al. |
| 2014/0099622 | A1 | 4/2014 | Arnold et al. |
| 2014/0287383 | A1 | 9/2014 | Willingham et al. |
| 2017/0003269 | A1 | 2/2017 | Brueckner et al. |
| 2017/0032694 | A1 | 2/2017 | Brueckner et al. |
| 2017/0032695 | A1 | 2/2017 | Brueckner et al. |

OTHER PUBLICATIONS

Amendment in Response to Office Action dated Jan. 8, 2018, from U.S. Appl. No. 14/811,403, filed Apr. 6, 2018, 18 pp.
Air Force SBIR/STIR Award Details, "CYDEST: CYber DEfense Simulation Trainer," Phase I, Award Details Status: Completed (Invited for Phase II) Start: Apr. 13, 2005 End Jan. 13, 2006, retrieved on Jun. 16, 2015 from http:// www.afsbirsttr.com/award/AWARDDetails.aspx?pk=12036, 2 pp.
Architecture Technology Corporation et ai.,"Cydest (Cyber Defense Simulation Trainer),"http://web.archive.org/web/20061107010247/www.atcorp.com/securesystems/cydesl.hlml, Dec. 2005, 1 pp.
ATC-NY et ai.,"Cyber Defense Simulation Trainer (CYDEST)," CYDEST Congressional Briefing, Feb. 19, 2007, 1 pp.
Bergstrom et al., "The Distributed Open Network Emulator: Using Relativistic Time for Distributed Scalable Simulation," Proceedings of the 20th Workshop on Principles of Advanced and Distributed Simulation, May 23-26, 2006, 7 pp.
Brueckner et al., "CYDEST Cyber Defense Simulation Trainer," ATC-NY a subsidiary of Architecture Technology Corporation, Oct. 29, 2007, 20 pp.
C.M.U. Entertainment Technology Center, "CyberSecurity," found at http://www.etc.cmu.edu/projects/cybersecurity/, Feb. 2000, 17 pp.
Carson et al., "NIST NET: A Linux-based network emulation tool" ACM SIGCOMM, Computer Communication Review, vol. 33, Issue 3, Jul. 2003, 16 pp.
Carver et al., "Military Academy Attack/Defense Network" IEEE Systems, Man, and Cybernetics Information Assurance and Security Workshop, West Point, NY, Jun. 17-19, 2002, 6 pp.
Crumb, "Hackles! Highlights Cyber Security Boot Camp," Air Force Research Laboratory (AFRL) Information Directorate document, Oct./Nov. 2004, 1 pp.
Davoli, "Virtual Square," Proceedings of the First International Conference on Open Source Systems, Genova, Jul. 11-15, 2005, 6 pp.
Davoli, "Virtual Square: all the virtuality you always wanted but you were afraid to ask," http://virtualsguare.org/ copyright Renzo Davoli, May 27, 2004, 1 pp.
Duggirala et al., "Open Network Emulator," found at hllp:I/csrl.cs.vl.edu/net_emulation.html, Jan. 15, 2005, 5 pp.
Honeynet Project, "Know Your Enemy: Defining Virtual Honeynets," hllp:I/old.honeynel.org/papers.virtual/, Jan. 27, 2003, 5 pp.
Howard et al., "A Common Language for Computer Security Incidents," Sandia National Laboratories Report, SAND98 8667, Oct. 1998, 32 pp.

(56) References Cited

OTHER PUBLICATIONS

Keshav, "REAL: A Network Simulator," Computer Science Division, Department of Electrical Engineering and Computer Science, University of Berkeley, Dec. 1988, 10 pp.
Krishna et al., "V-NetLab: A Cost-Effective Plafonn to Support Course Projects in Computer Security", Department of Computer Science, Stony Brook University, Jun. 2005, 7 pp.
Lathrop et al., "Information Warfare in the Trenches: Experiences from the Firing Range," U.S. Military Academy, Security education and critical infrastructures, Kluwer Academic Publishers Norwell, MA, USA© Jun. 23-26, 2003, 22 pp.
Lathrop et al., "Modeling Network Attacks in MAADNET," 12th Conference on Behavior Representation in Modeling and Simulation, May 12-15, 2003, 16 pp.
Liljenstam et al., RINSE: The Real- Time Immersive Network Simulation Environment for Network Security Exercises, Proceedings of the 19th Workshop on Principles of Advanced and Distributed Simulation (PADS), Jun. 2005, 10 pp.
McDonald, "A network specification language and execution environment for undergraduate teaching," ACM SIGCSE Bulletin, vol. 23, Issue 1, Mar. 1991, 11 pp.
McGrath et al., "NetSim: A Distributed Network Simulation to Support Cyber Exercises," Institute for Security Technology Studies, Dartmouth College, Huntsville Simulation Conference, Mar. 9-11, 2004, Huntsville, Alabama, 6 pp.
Padman et al., "Design of a Virtual Laboratory for Information Assurance Education and Research," Proceedings of the 2002 IEEE, Workshop on Information Assurance and Security, U.S. Military Academy, West Point, Jun. 2002, 7 pp.
Saic et al., "TeamDefend, A White Paper on Strengthening the Weakest Link: Organizational Cyber Defense Training," 17th Annual FIRST Conference, Jun. 26-Jul. 1, 2005, 6 pp.
Saunders, "Simulation Approaches in Information Security Education," Proceedings of the Sixth National Colloquium for Information Systems Security Education, Redmond, Washington, Jun. 4-6, 2002, 14 pp.
Schafer et al., "The IWAR Range: A Laboratory for Undergraduate Information Assurance Education," Military Academy West Point, NY, Research paper, found at http:I/handle.dtic.mil/1 00.2/ADA408301, Nov. 7, 2000, 7 pp.
Schepens et al., "The Cyber Defense Exercise: An evaluation of the Effectiveness of Information Assurance Education" 2003 (Applicant points out, in accordance with MPEP 609.04(a), that the year of publication, 2003, is sufficiently earlier than the effective U.S. filing date 2017, so that the particular month of publication is not in issue.) 14 pp.
Stumpf et al., "NoSE—building virtual honeynets made easy," Darmstadt University of Technology, Department of Computer Science, D-64289 Darmstadt, Germany, Jan. 2005, 11 pp.
Stytz et al., "Realistic and Affordable Cyberware Opponents for the Information Warfare BattleSpace," Jun. 2003, 42 pp.
Varga, "The OMNeT ++ Discrete Event Simulation System," Department of Telecommunications, Budapest University of Technology and Economics, Proceedings of the European Simulation Multiconference, Jun. 2001, 8 pp.
Vrable et al., "Scalability, Fidelity, and Containment in the Potemkin Virtual Honeyfarm," SOSP, Oct. 23-26, 2005, 15 pp.
Wang et al., "The Design and Implementation of the NCTUns 1.0 Network Simulator," Computer Networks, vol. 42, Issue 2, Jun. 2003, 23 pp.
White et al.,"Cyber Security Exercises: Testing an Organization's Ability to Prevent, Detect and Respond to Cyber Security Events," Proceeding of the 37th Hawaii International Conference on System Sciences, Jan. 2004, 10 pp.
Zeng et al., "GloMoSim: A library for Parallel Simulation of Large-scale Wireless Networks" ACM SIGSIM Simulation Digest, vol. 28, Issue 1, Jul. 1998, 9 pp.
Prosecution History from U.S. Appl. No. 14/811,403, dated Jul. 6, 2017 through Oct. 4, 2017, 32 pp.
U.S. Appl. No. 16/059,716, filed by Stephen K. Brueckner et al., [Architecture Technology Corporation], filed on Aug. 9, 2018.
Notice of Allowance from U.S. Appl. No. 14/811,403, dated May 22, 2018, 7 pp.
Cohen, "Simulating Cyber Attacks, Defenses, and Consequences," Fred Cohen & Associates, retrieved from http://all.net/journal/ntb/simulate/simulate.html, Mar. 1999, 36 pp.
DeLooze et al., "Incorporating Simulation into the Computer Security Classroom," 3ath ASEE/IEEE Frontiers in Education Conference S1F-13, Oct. 2004, 6 pp.
EADS NA Defense Security & Systems Solutions Inc., "How can Cybersecurity Network TRaining Simulator (CYNTERS) benefit Department of Defense, Federal and Commercial agencies' information assurance programs?," Feb. 20, 2008, 4 pp.
Killcrece et al., "State of the Practice of Computer Security Incident Response Teams (CSIRTs)," Carnegie Mellon Software Engineering Institute Technical Report CMU/SEI-2003-TR-001 ESC-TR-2003-001, Oct. 2003, 293 pp.
Pratt, "The Xen™ virtual machine monitor," University of Cambridge Computer Laboratory Systems Research Group NetOS, retrieved from https://www.cl.cam.ac.uk/research/srg/netos/projects/archive/xen/, last updated Feb. 25, 2008, 2 pp.
U.S. Appl. No. 16/137,735, filed Sep. 21, 2018, by Brueckner et al.

* cited by examiner

| INSTRUCTORS | PLUGINS | | | |
|---|---|---|---|---|
| CYRIN AGENT PLUGINS ||||||
| ⟲ ▢ \| ⊕ ADD NEW ⊖ DELETE ||||||
| ID | DATE ADDED | NAME | DESCRIPTION | UPLOADER |
| 1 | 02/13/2015 | FILE SYSTEM MONITOR | REPORTS CHANGES TO FILES... | ADMIN |
| 2 | 02/13/2015 | LOGIN_TEST | ATTEMPTS TO LOG A USER IN | ADMIN |
| 3 | 02/13/2015 | EMAIL_SENDER | SENDS AN EMAIL VIA THE... | ADMIN |
| 4 | 02/13/2015 | NETWORK CONNECTION LIST | LISTS CURRENT NETWORK CO... | ADMIN |
| 5 | 02/13/2015 | NETWORK CONNECTION MO... | REPORTS START/STOP OF NE... | ADMIN |
| 6 | 02/13/2015 | PROCESS LIST | LISTS CURRENT RUNNING PR... | ADMIN |
| 7 | 02/13/2015 | PROCESS MONITOR | REPORTS START/STOP OF PR... | ADMIN |
| 8 | 02/13/2015 | PROGRAM LIST | CREATES A LIST OF ALL PROG... | ADMIN |
| 9 | 02/13/2015 | REGISTRY MONITOR | REPORTS CHANGES TO SPEC... | ADMIN |
| 10 | 02/13/2015 | REMOTE PORT MONITOR | CHECK FOR CONNECTION TO... | ADMIN |
| 11 | 02/13/2015 | SESSION MONITOR | REPORTS CHANGES TO USER... | ADMIN |
| 12 | 02/13/2015 | WEBPAGE SEARCH | REPORTS IF A WORD IS LOCA... | ADMIN |
| SERVER RESPONSE 0.126 SEC |||| 1-12 OF 12 (BUFFERED 12) |

FIG. 3

AGENT:
FILE SYSTEM MONITOR ▽ ← (1)

POINTS:
[          ] ← (2)

AGENT OPTIONS:
DIRECTORY:    [          ] ⓘ
FILE NAME FILTER: [          ] ⓘ ← (3)

EVALUATION CRITERIA:
| PATH | CONTAINS ▽ | | ⓘ |
| STATUS | CONTAINS ▽ | | ⓘ |
| RENAMED_TO | CONTAINS ▽ | | ⓘ |
| CHANGE_TYPE | CONTAINS ▽ | | ⓘ |

← (4)

APPLY TO NODE: [WEBSERVER ▽] ← (5)

[ SAVE ]   [ CANCEL ]

MODULAR TRAINING OF NETWORK-BASED TRAINING EXERCISES

This application is a continuation-in-part of U.S. application Ser. No. 14/811,403, filed Jul. 28, 2015, the entire contents of which is incorporated by reference herein.

STATEMENT REGARDING FEDERALLY SPONSORED RESEARCH OR DEVELOPMENT

This invention was made with Government support under Contract No. FA8650-14-C-6511. The Government has certain rights in this invention.

TECHNICAL FIELD

This disclosure relates to computing systems and, more particularly, to computing systems that implement network-based training exercises.

BACKGROUND

One of the more effective methods of skill acquisition is problem-based learning. In the case of cyber operations, problem-based learning may be achieved by providing realistic, hands-on cyber exercises to trainees. The military, commercial enterprises, and academic institutions all conduct cyber exercises to educate and train personnel. Exercises are conducted in both individual and group formats, and team exercises may be conducted cooperatively or as competitions.

Computer-based training may one of the more effective teaching methods available today, as evidenced, for example, by the military's dedication to training exercises in preparation for battle (e.g., flight simulators). Computer-based training exercises may cover a wide array of training topics, and trainees may have the flexibility of performing training exercises using either local or remote computer connections. Trainees may even obtain online training via the Internet. The personnel who set up, monitor, and assess cyber exercises are often referred to as the "white team."

Currently, there are certain computer-based training exercises that involve simulation within a training environment. Trainees can often obtain a great amount of educational training by performing actions in such a training environment. A number of different types of environments that are used today provide varying levels of training and evaluation. For example, certain environments, such as those that may often be used in the military, allow trainees to engage in complex or sophisticated training exercises, and may also allow trainees to work with others in a team setting.

SUMMARY

In one example, a method includes deploying, by a training system and on one or more virtual machines in a network, one or more training environments that are configured to execute one or more training exercises, wherein the training system comprises one or more modular systems that provide respective functionalities for configuring the one or more training exercises. The method also includes deploying, by the training system and for execution by one or more remote host computing systems that are communicatively coupled to the network, one or more software agents that are executed during the one or more training exercises, wherein the one or more software agents are configured to collect parameter data from the one or more remote host computing systems while one or more trainees perform actions during the training exercise. The method also includes receiving, by the training system and from the one or more remote host computing system via the network, the parameter data collected by the one or more software agents during execution of the one or more training exercises.

In another example, a training system include one or more memories; one or more hardware-based processors; and at least one virtual machine for providing one or more training environments; wherein the one or more hardware-based processors configured to: deploy the one or more training environments to one or more remote host computing systems; deploy one or more training exercises in the one or more training environments and deploy one or more software agents that are executed during the one or more training exercises, wherein the one or more software agents are configured to collect parameter data from the one or more remote host computing systems while the one or more trainees perform actions during the one or more training exercises; and evaluate the parameter data collected from the one or more remote host computing systems while the one or more trainees perform actions during the one or more training exercises.

In another example, a computer-readable storage medium includes instructions that, when executed, cause one or more processors to perform operations comprising: deploying, on one or more virtual machines in a network, one or more training environments that are configured to execute one or more training exercises; deploying, for execution by one or more remote host computing systems that are communicatively coupled to the network, one or more software agents that are executed during the one or more training exercises, wherein the one or more software agents are configured to collect parameter data from the one or more remote host computing systems while the one or more trainees perform actions during the training exercise; and receiving the parameter data collected by the one or more software agents during execution of the one or more training exercises.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIG. 3 is a screen diagram illustrating a non-limiting list of agents and/or metric plugins for agents 14, in accordance with one or more aspects of the present disclosure.

FIG. 6 is a screen diagram illustrating an example agent configuration form, in accordance with one or more aspects of the present disclosure.

FIGS. 9 and 10 are screen diagrams illustrating example forms for assigning teams to objectives or skills, in accordance with one or more aspects of the present disclosure.

FIG. 13 is a screen diagram illustrating an example of detailed team exercise results that may be provided by the evaluation dashboard, in accordance with one or more aspects of the present disclosure.

DETAILED DESCRIPTION

Figure 1:
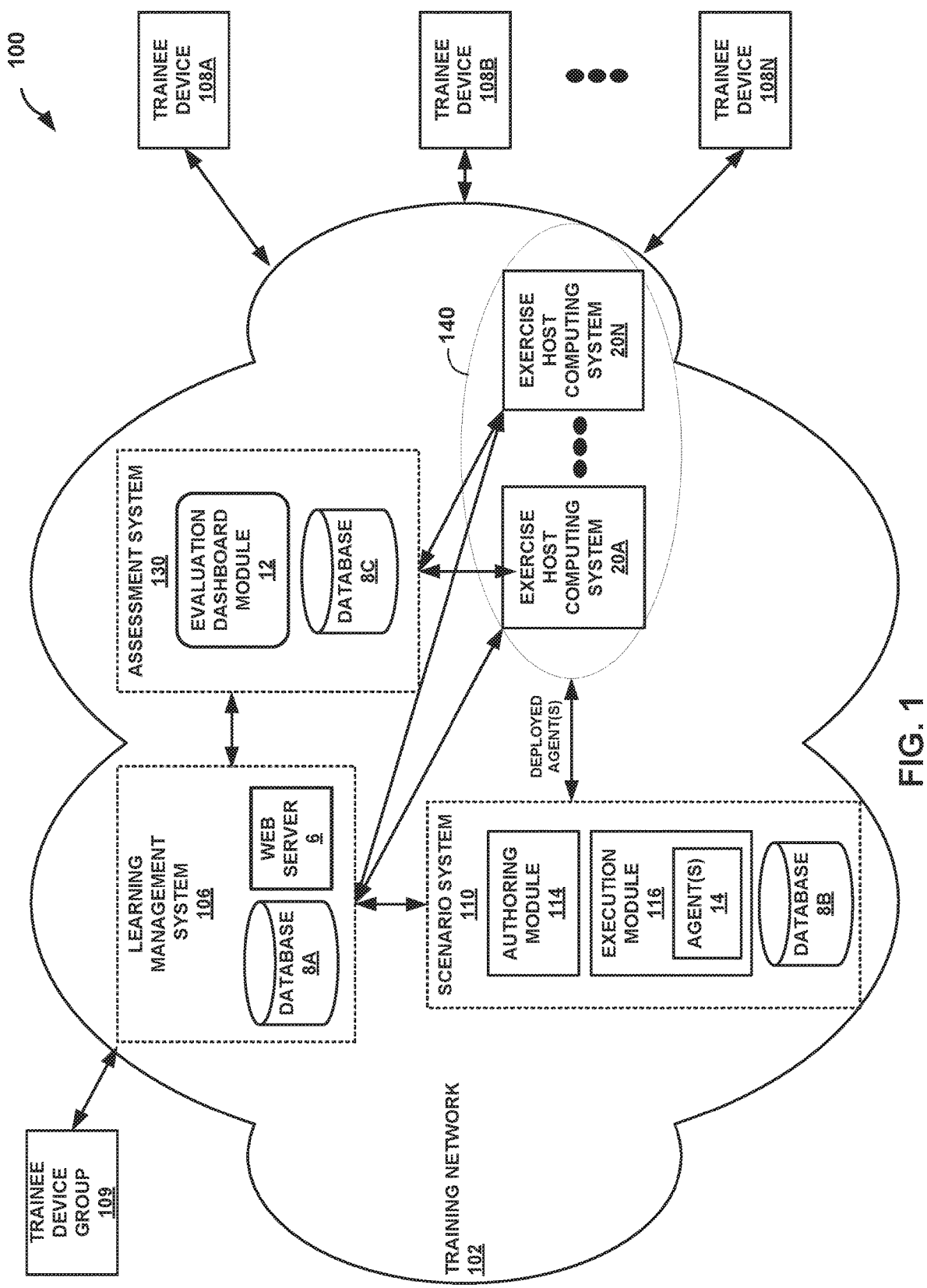
FIG. 1 is a block diagram illustrating an example modular training system, in accordance with one or more aspects of the present disclosure.

As described above, the group of trainees that conduct training exercises are often grouped in multiple units or large-scale groups (referred to herein as "multi-unit training environment"). Effective technologies to deploy one or more training exercises in a distributed fashion for multi-unit training are currently lacking. As a result, the development of cyber exercises is often costly and deployment of cyber exercises is often disrupted due to travel requirements for remote training.

Significant effort may, in some cases, be required to devise mission scenarios for cyber range networks. These multi-unit training environments involve large scale group exercises, and development for these environments are time consuming and expensive to develop and deploy. Due to the larger costs and development complexities, training environments are limited in availability. That is, training environments developed for large-scale group exercises are often inflexible, often limiting the training environment to a single location (e.g., one test range network) of a physical host. As a result, cyber exercises are often deployed in a single location, resulting in higher travel costs due to travel from groups of trainees to conduct training exercises. Moreover, these training environments are difficult to maintain and update.

One or more techniques of the present disclosure provide one or more systems that provide modular multi-unit training environments. These systems have the capability to function as a standalone system or have modular pieces of the system that may be individually provided to existing cyber ranges or other training environments, e.g., live training environments, which may be geographically distributed. That is, these systems may be hardware agnostic and may be modularly deployed to a network of physical systems or run on dedicated servers to provide an existing training environment with additional functionality. Moreover, these systems may export course materials and move from one training environment to another with minimal changes to the materials. In other words, the course materials may be deployed across multiple training environments, even if the training environments use different hardware.

According to one or more aspects, these systems use a series of preconfigured virtual machines to emulate a real network. The systems use agents that are deployed on the virtual network to collect exercise data and provide interactive dashboards that assist "white team members" (e.g., personnel who set up, monitor, and assess cyber exercises) with planning and monitoring cyber exercises, and also with evaluating trainee performance. These flexible agents support a wide variety of cyber platforms and missions, thereby potentially eliminating the need for expensive or inadequate custom-built solutions. A fine-grained situational awareness provided by these systems during cyber exercises can, in some cases, be used to improve classroom training and thereby improve the overall effectiveness of the training experience. Dashboard interfaces may also be provided to assist in planning and monitoring an exercise and analyzing its results.

FIG. 1 is a block diagram illustrating an example modular training system 100 that includes an learning management system 106, a scenario system 110, an assessment system 130, and a virtual training environment 140, according to one or more aspects of the present disclosure. In various examples, modular training system 100 may comprise a system including one or more processors. Virtual training environment 140 may comprise one or more exercise host computing systems 20A-20N (collectively, "exercise host computing systems 20"), each comprising a heterogeneous training exercise network of computing systems, or test range network, which are communicatively coupled to learning management system 106 via one or more networks, such as one or more wired and/or wireless networks. Each of exercise host computing systems 20 may utilize one or more virtual machines within one or more virtual networks. Virtual machines are full-fidelity and are therefore fully realistic, and they also may provide certain advantages over using real computers, such as having reduced hardware footprints, easier scenario management, and better visibility for evaluation and control. As further described below, learning management system 106 may provide trainee computing devices 108A-108N (collectively, "trainee devices 108") and a trainee device group 109 (which may include one or more computing devices) with remote or local access to exercise host computing systems 20.

One or more white team members may use learning management system 106 to create course materials for training exercises, such as written tests, for training environments. White team members may also use learning management system 106 to incorporate configurable virtual networks, e.g., virtual training environment 140, that integrate with hardware based networks. That is, learning management system 106 may provide one or more trainees using trainee devices 108 or a group of trainees associated with trainee device group 109 access to the course work.

For example, a white team member may use learning management system 106 to configure a series of preconfigured virtual machines such that the virtual machines represent a real network. This virtual network can be isolated to an individual trainee using one of trainee devices 108 or expanded for a group of trainees associated with trainee device group 109 that can access the virtual network. Each of the virtual machines may include a variety of operating systems, such as, for example, the Windows and/or Linux platforms.

Learning management system 106 includes database 8A and web server 6. In certain non-limiting examples, database 8A (and databases 8B and 8C) may comprise a standalone SQLite database that is linked to web server 6. Created course materials are stored in database 8A. Web server 6 may access existing networks to provide the course materials to existing training environments. That is, a course developed in one location may be deployed across multiple cyber ranges, even if those ranges use different hardware. As one example, any of trainee devices 108 or trainee device group 109 may access, via web server 6, the course materials for the training exercises provided by exercise host computing systems 20 of virtual training environment 140. In this way, learning management system 106 may move course materials from one training environment to another, which simplifies the development and maintenance of course materials.

Learning management system 106 may be implemented as part of a standalone multi-unit training environment, whereby learning management system 106 may be used in conjunction with scenario system 110, assessment system 130, and virtual training environment 140 to provide exercise scenarios to trainees of multiple units. Learning management system 106 may also be deployed modularly to provide existing training environments additional features, e.g., configuration of virtual networks and course materials and/or providing access to the course materials.

White team members may use scenario system 110 to create training environments within the virtual networks. For example, scenario system 110 may include an authoring module 114, execution module 116, and database 8B. Authoring module 114 may be used to map out a network for training exercises and execution module 116 may determine which agents 14 to deploy onto exercise host computing systems 20 in the network. For example, authoring module 114 may include a planning dashboard (not shown) that leads the user through a series of steps using, e.g., graphical tools, forms, and/or drop-down menus to facilitate the configuration of an exercise scenario implemented within one or more exercise host computing systems 20 of virtual training environment 140 and store the exercise scenario in database 8B. That is, white team members may use authoring module 114 to create a monitoring and scoring plan for the exercise. By creating training environments within the virtual networks, a training environment that involves constant recreation or is constantly cleared for a different training session can be easily recreated after each use.

As one example, a user may use scenario system 110 to configure one of exercise host computing systems 20 as an attack system and another one of exercise host computing systems 20 as a target system that are each executable by the one or more processors (wherein the attack system and the target system may, in some cases, comprise the same system, such as in an insider attack), and include within the systems one or more agents 14 to collect information based on training scenarios. In this way, scenario system 110 provides the scenario in which trainees 108 and/or group of trainees 109 may function as a particular unit, either adversely or cooperatively, to achieve a training objective.

In some examples, the white team members may use execution module 116 to configure and deploy a set of one or more modular agents 14 and objective metrics for use during the exercises. Execution module 116 may include a remote command system (not shown), which is operable to interact with agents deployed across the virtual training environment 140. As one non-limiting example, a single instance remote command may be used for each one of exercise host computing systems 20 in the virtual training environment 140. These remote command processes or threads execute agents 14 on virtual hosts. In some examples, agent output is formatted as Extensible Markup Language (XML) snippets, which provides a message-based communication format that is easily parsed and interpreted by assessment system 130. In these examples, the XML messages may be piped via standard out (STDOUT) and standard error (STDERR) to the aggregator component assessment system 130, which saves them in the database 8C of assessment system 130 and also notifies event listeners for any actions to be taken. Communication between the agents and scenario system 110 may be encrypted, such as via the Secure Sockets Layer (SSL) protocol.

Agents 14 deployed by scenario system 110 do not necessarily require any pre-installed infrastructure on exercise host computing systems 20, which may reduce the effort required to deploy agents 14 and accommodates dynamic changes to exercise networks. Agents 14 may emphasize the forensic principle of non-interference by minimizing their footprint within an exercise, both temporally and spatially, which may add to the realism of an exercise. Agents 14 can be ephemeral, such that they do not necessarily have to stay resident on exercise host computing systems 20 over extended amounts of time, which can reduce the chance that trainees will be able to "game the system" by observing or altering agents 14. In this way, agents 14 may react to different states in the training environment, thereby allowing for seamless integration with an existing environment.

Agents 14 may be configured for execution on one or more different types of architectures or operating systems, such as, for example, the Windows and/or Linux platforms. In the example of FIG. 1, agents 14 are also configured for execution on one or more exercise host computing systems 20 of virtual training network 140. For example, scenario system 110 deploys agents 14 onto one or more of exercise host computing systems 20 of virtual training environment 140 and captures exercise data based on the actions conducted within the exercise host computing systems 20 by one or more trainee devices 108 that are geographically dispersed and/or from a plurality of trainees from trainee device group 109 located in the same geographical location.

As a non-limiting example, one of agents 14 may comprise a file watcher agent that stays resident on a target exercise host computing system of systems 20 and alerts assessment system 130 as to changes in files. Its parameters include a list of files and/or directories to watch and how long to continue watching. It will notify assessment system 130 when a file changes and indicate the nature of the change (e.g., file was created, renamed, written to, read, deleted). As another example, one of agents 14 may comprise a session monitor agent that returns a list of user login/logout events. This agent can be parameterized to return this list and terminate, or to stay resident and notify assessment system 130 of any further logins/logouts as they occur.

Agents 14 may also provide one or more tools to an existing training environment. For example, a training environment may lack one or more tools, e.g., Netcat, which is not installed on the training environment. An agent may provide the training environment with one or more tools, e.g., Netcat, such that the training environment is now able to scan ports even if the system the agent is running on does not have Netcat installed.

Scenario system 110 may be implemented as part of a standalone Multi-Unit training environment, whereby scenario system 110 may be used in conjunction with learning management system 106, assessment system 130, and virtual training environment 140 to provide exercise scenarios to trainees of multiple units. Scenario system 110 may also be deployed modularly to provide existing training environments additional features, e.g., configuration of exercise scenarios and deployment of agents into the existing training environments.

White team members may use assessment system 130 to evaluate the exercise data provided by agents 14 during the training session, such as team or individual scores. Assessment system 130 may receive agent output via, e.g., a Transmission Control Protocol (TCP) network connection. Assessment system 130 may, e.g., include an evaluation dashboard module 12 that presents the exercise status as a dynamic web page accessible by white team members, and database 8C to store output from agents 14. The exercise status may include results in a set of dynamic, web accessible briefing documents to orient both white team members and trainees on the exercise and expectations. Evaluation dashboard module 12 provides analysis tools, including playback capabilities (e.g., start, stop, rewind, fast forward, and ump to any part of the training), and produces a set of dynamic documents to assist white team members with debriefing and after-action reports (AARs). Assessment system 130 may be used to monitor an exercise, assess trainee performance, and prepare debriefing documents. For example, assessment system 130 may include an aggregator (not shown) that interacts with agents 14 deployed across the virtual training environment 140.

Figure 2:
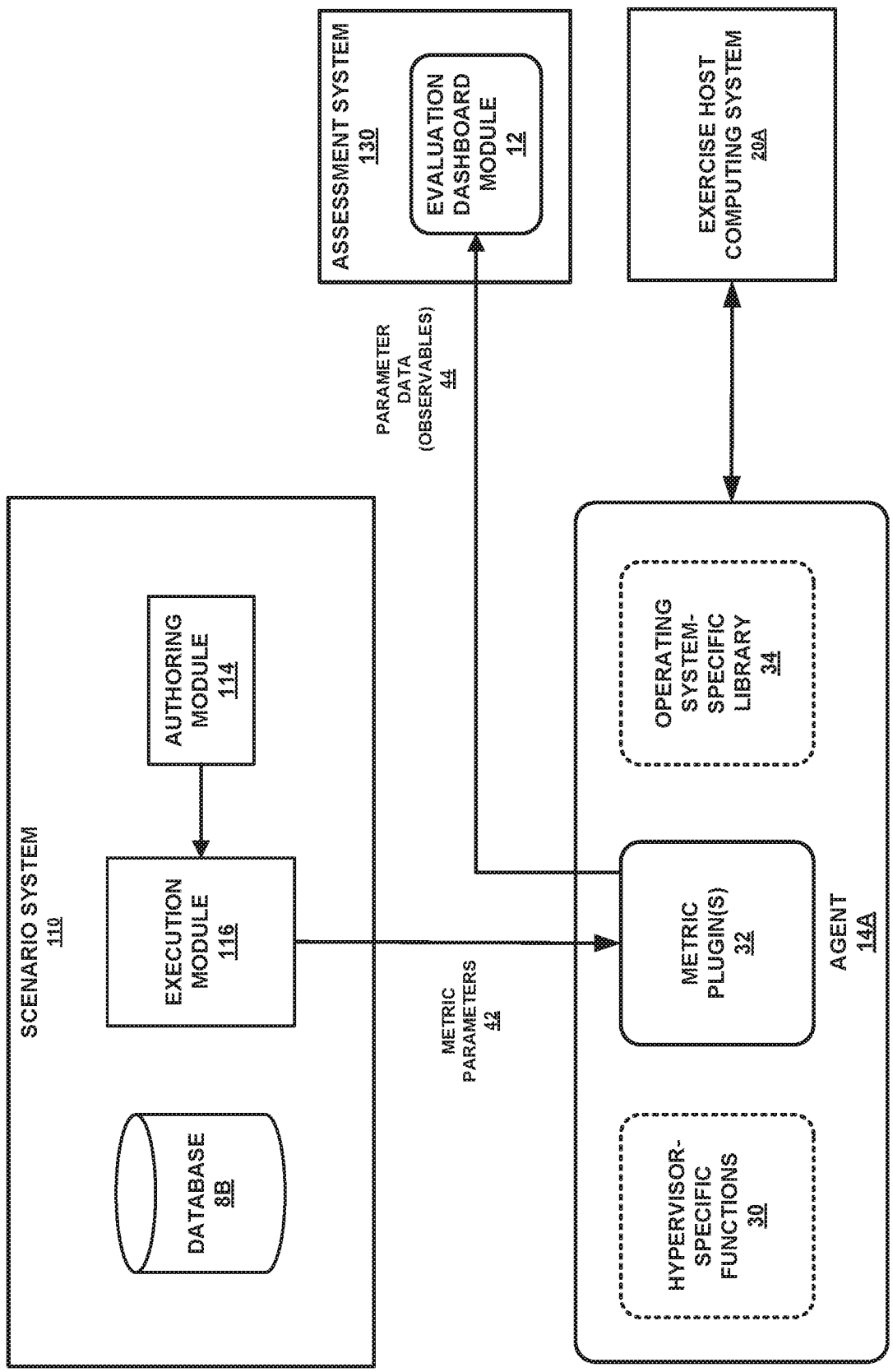
FIG. 2 is a block diagram illustrating an example agent and an example exercise host computing system, in accordance with one or more aspects of the present disclosure.

Agents 14 can be launched on demand or run throughout the exercise, so assessment system 130 can use either a pull model or a push model for data acquisition from the agents. The pull model is, in some cases, more flexible and has a lighter footprint, but the push model may, in certain cases, have better performance. Agents 14 can operate on virtual machines directly through the hypervisor, without leaving any traces on the network. Hypervisor agents may not leave any footprint (e.g., packets, network connections) on the exercise network for trainees to see. Further example details of one of agents 14 is illustrated in FIG. 2, as described further below. In some examples, agents 14 use a three-layer modular design that includes a number of pre-built plugins for hypervisors, operating systems, and performance metrics. This provides the flexibility to support a wide variety of platforms and missions.

Assessment system 130 may be implemented as part of a standalone multi-unit training environment, whereby assessment system 130 may be used in conjunction with learning management system 106, scenario system 110, and virtual training environment 140 to provide monitor performance of multiple trainees of a multi-unit within exercise scenarios. Assessment system 130 may also be deployed modularly to provide existing training environments additional features, e.g., evaluation of exercise data provided by agents 14 during the training session.

During training exercises that are performed within exercise host computing systems 20 of virtual training environment 140, each of the trainees using trainee devices 108, or the group of trainees using trainee device group 109, can be evaluated according to whether they accomplish high-level learning objectives. These trainees, individually or as a group, are able to meet each objective by demonstrating one or more skills during a cyber exercise. Demonstration of a skill can be measured with a set of metrics, which are calculated from observables/parameter data. In certain examples, there are two types of observables in a cyber exercise: measurements (e.g., determination of system state at a point in time), and events (e.g., changes to system state at a point in time). Agents 14 are configured to gather observables from exercise host computing systems 20 in virtual training environment 140, and these observables are used by assessment system 130 to calculate one or more metrics that may be evaluated by white team members. For purposes of illustration only, example metrics may include one or more of the following: number of attacks detected by a defending team compared to total number of attacks; time taken to recover from a successful attack; number of attacks successfully identified; number of open ports/services detected by a scanning team compared to total number open; downtime of an attacked service compared to attack duration; average team time to accomplish a goal; and/or the time taken to gather all artifacts in a forensics exercise. Assessment system 130 may provide results in a web accessible briefing document based on the number of metrics. In some examples, the assessment system 130 may provide the results to the learning management system 106. Although agents 14 are described as being deployed in virtual training environment 140, agents 14 may also be deployed in hardware training environments.

Exercise host computing systems 20 illustrated in FIG. 1 may execute one or more operating systems (e.g., Windows or Linux). These computing systems 20 may execute natively compiled ones of agents 14 that dynamically load natively compiled plugins. These plugins measure specific types of metrics during an exercise. Along with the plugins, parameters are passed to the agents that specify the behavior of the plugin, including what data it collects and how long it should run. For example, an agent may be compiled to run on Windows, load a plugin designed to inspect a Windows host's network configuration, load parameters that specify that the plugin return a list of open network ports to assessment system 130, and then terminate. This list is used to inform assessment functionality. For example, a trainee may be required to secure a host by filtering certain ports.

As will be described in further detail below, one or more techniques of the present disclosure may provide a method that includes deploying, by modular training system 100 and to one or more virtual machines in a network, one or more training environments that are configured to execute one or more training exercises. The techniques may also provide a method that includes deploying, by modular training system 100 and for execution by one or more remote host computing systems, one or more software agents that are associated with one or more skill nodes representing one or more skills to be demonstrated by one or more trainees using the one or more remote host computing systems during the one or more training exercises. For example, the training environment may be deployed in a remote training environment for which one or more agents 14 are executed during the one or more training exercises. These software agents are configured to collect parameter data from the one or more remote host computing systems while the one or more trainees perform actions during the training exercise. The techniques may also provide a method that includes receiving, by the modular training system and from the one or more remote host computing system via the network, parameter data collected by the one or more software agents during execution.

As noted above, modular training system 100 may act as a standalone system, whereby learning management system 106, scenario system 110, assessment system 130, and virtual training environment 140 may function as a standalone system to provide training exercises locally or remotely accessible to geographically dispersed trainee devices 108 and trainee device group 109. In other examples, learning management system 106, scenario system 110, assessment system 130, or virtual training environment 140 may individually, or collectively, be deployed to existing training environments such that the modules may provide additional functionality to the existing training environments. For example, an existing training environment may lack the configuration and deployment of agents. Modular training system 100 may deploy scenario system 110 to the existing training environment such that the training environment may configure and deploy agents. In another example, an existing training environment may lack online course materials. As such, modular training system 100 may deploy learning management system 106 to the existing training environment such that learning management system 106 may generate course materials for the existing training environment.

In this way, modular training system 100 may provide a standalone system or provide one or more individual systems to existing training environments such that the modular training system 100 may easily deploy multi-unit capable training environments. That is, the ability to deploy training environments and/or move course materials to different training environments reduces the effort required for course production and maintenance.

FIG. 2 is a block diagram illustrating an example agent 14A and an example exercise host computing system 20A, in accordance with one or more techniques of the present disclosure. Agent 14A is an example of one of agents 14 illustrated in FIG. 1 that may be deployed by scenario system 110, and exercise host computing system 20A is an example of one of exercise host computing systems 20 illustrated in FIG. 1.

In the example of FIG. 2, the agent design provides the flexibility to run on a wide variety of target systems, such as exercise host computing system 20A. As described above in reference to FIG. 1, agents 14 may include one or more hypervisor agents 30, which are agents that are deployed onto virtual machine platforms that host exercise host computing systems 20, and exercise host computing systems 20 may comprise one or more virtual machines. Hypervisor agents 30 may not leave any footprint (e.g., packets, network connections) on the exercise network for trainees to see. In the example of FIG. 2, agent 14A may, in some non-limiting cases, comprise a hypervisor agent that comprises one or more hypervisor-specific functions 30.

In these cases, hypervisor-specific functions 30 may provide access to the one or more virtual machines. In one example, a console can be established through a virtual machine's virtual serial port. In one example, a Virtual Machine Communications Infrastructure (VMCI) provides communication between a virtual machine and a host operating system of host computing system 20A using a socket interface. In one example, a Host-Guest Communication Manager (HGCM) allows a virtual machine to call a shared library on host computing system 20A.

In some examples, however, agent 14A may not comprise a hypervisor agent and may not include hypervisor-specific functions 30. In these examples, agent 14A may be deployed directly on exercise host computing system 20A.

FIG. 2 shows that agent 14A can be equipped with a variety of one or more metric plugins 32 to collect and provide assessment system 130 with parameter data (observables) 44 during a training exercise using exercise host computing system 20A. Furthermore, these metric plugins 32 can be parameterized to further broaden their application for increased flexibility. Metric plugins 32 may be parameterized by receiving, for example, one or more metric parameters 42 from execution module 116 of scenario system 110.

Once deployed, an agent, such as agent 14A, is a program that executes and that may send information to assessment system 130. Agent 14A may run with administrator privileges to ensure maximum access.

In general, agent 14A and metric plugins 32 can be written to provide a wide range of functions. The following are non-limiting examples of the types of agents that may be implemented: (1) general execution agent—an agent that runs an arbitrary shell command on exercise host computing system 20A. This type of agent can be parameterized (e.g., by receiving metric parameters 42 from execution module 116) to send all stdout/stderr results from exercise host computing system 20A to assessment system 130. (2) process monitor agent—an agent that uses an application programming interface of the operating system of exercise host computing system 20A to acquire a list of processes running on exercise host computing system 20A. This type of agent can be parameterized to return the full list or only return processes that match a given regular expression. (3) remote connection agent—an agent that uses host computing system's network access to attempt connections to another host. This type of agent can be parameterized with the Internet Protocol address and port number of exercise host computing system 20A, and optionally a client protocol to emulate, and the agent will return success or failure of the attempted connection, and can also return any packets received from exercise host computing system 20A. (4) registry monitor agent—an agent that monitors the registry of exercise host computing system 20A for key changes. This type of agent can be parameterized to monitor only keys matching a regex, and will return the new value of any keys. (5) time check agent—an agent that executes on each target (e.g., on exercise host computing system 20A) at the beginning of an exercise (e.g., at a minimum) so assessment system 130 can record the time differentials between exercise host computing systems 20 and scenario system 110 and accurately report monitoring results. The time check agent may be used in cases where the clocks of each of exercise host computing systems 20 are not necessarily synchronized. Additional examples of agents will be described in further detail below.

The parameters listed in the non-limiting examples above, which may be included in metric parameters 42 shown in FIG. 2, are functional parameters. An agent's operational mode is another type of parameter that may be included in metric parameters 42. The principal modes for agents 14, according to certain examples, are to either terminate after executing their respective commands or to stay resident for the purposes of returning additional data at a later time. In the latter case, a persistent agent can either actively poll the state of exercise host computing system 20A (e.g., to take repeated measurements) or use an operating system hook (e.g., via option operating-system specific library 34, which may be specific to the operating system used by exercise host computing system 20A) to passively monitor exercise host computing system 20A and wait for events. In various examples, agents 14, including agent 14A, are capable of running in each of these modes. Furthermore, one or more techniques for configuring and deploying agents 14 to acquire data from exercise host computing systems 20 and provide such data to assessment system 130 are described in U.S. Patent Application Publication 20120210427 by Bronner et al, entitled "Configurable Investigative Tool," which is incorporated herein by reference in its entirety. In some cases, parameter data 44 may indicate at least one event that is associated with at least one action that is performed by a trainee or group of trainees during a training exercise using exercise host computing system 20A.

In various examples, scenario system 110 may determine one or more metrics that are usable to determine if one or more skills have been demonstrated by a trainee during a training exercise, and identifying certain types of parameter data that can be collected by exercise host computing system 20A in order to calculate these one or more metrics. Execution module 116 of scenario system 110 may then provide metric parameters 42 to configure metric plugins 32 of agent 14A to collect the parameter data, including in parameter data 44, which is used to calculate these metrics for use by assessment system 130. Assessment system 130 may then determine whether one or more skills represented by one or more skill nodes in a graphical dashboard, e.g., via evaluation dashboard module 12, as will be described in further detail below, have been demonstrated by the trainee during the training exercise by calculating, based on parameter data 44, the one or more metrics to determine if the one or more skills have been demonstrated.

In certain other examples, a non-limiting list of agents and/or metric plugins for agents 14 utilized with respective ones of exercise host computing systems 20 are illustrated in FIG. 3. As indicated in the example of FIG. 3, a file system monitor agent/plugin reports changes to files in a specific directory (and all subdirectories) for a given host computing system. A login test agent/plugin attempts to create a session (e.g., log in) with the user-specified log-in credentials. An email sender agent/plugin attempts to send a "test" email message to a specified server (e.g., Simple Mail Transfer Protocol server). A network connection list agent/plugin lists all active network connections on a host computing system. A network connection monitor agent/plugin monitors network connections with a given host computing system. A process list agent/plugin is configured to list currently running processes on a host computing system. A process monitor agent/plugin monitors running processes on host computing system and reports when processes whose name matches a user-specified pattern starts or stops.

As also indicated in FIG. 3, a program list agent/plugin lists installed applications on a given host computing system. A registry monitor agent/plugin reports when changes are made to a registry (e.g., Windows registry) of a host computing system. A remote port monitor agent/plugin checks for open network ports on remote hosts and attempts to establish a network connection to a remote host on a specified port. Examples of how this plugin can be used include checking if services (e.g., web or ssh servers) are or are not running or if a firewall is configured property. A session monitor agent/plugin monitors active user sessions (e.g., looks for currently logged-on users). A webpage search agent/plugin attempts to retrieve a web page from a remote host, and can optionally search the returned data for a user-specified regular expression.

In utilizing scenario system 110, agents 14, and exercise host computing systems 20 shown in FIGS. 1 and 2 for training, cyber exercises, a first step may comprise capturing the information about the cyber exercise that is used to set up monitoring and evaluation. Authoring module 114 may, e.g., output a planning dashboard that leads the user through a series of steps using, e.g., graphical tools, forms, and/or drop-down menus to facilitate the process. If the white team has not already set up a cyber exercise, it can use authoring module 114 to specify a new one. In either case, the result of the first step may, in some cases, be a set of files in machine-parsable formats that contains the information about the exercise.

A second step may involve planning how the exercise will be monitored and how trainees evaluated. The planning dashboard of authoring module 114 can guide the user through another series of steps, from learning objectives to agent selection, as described in further detail below. The results will be, e.g., a monitoring plan in a machine-parsable format and the set of agents 14 that will collect metrics during the exercise.

According to one or more examples, the planning dashboard output by authoring module 114 may include a back end and a front end. The back end may comprise one or more scripts that interact with database 8B. Planning activities will generally populate database 8B with the results of exercise capture and the monitoring plan. However, some scripts will fetch information from database 8B to populate the user interface (e.g., to populate web forms with options for the user).

The front end may comprise be a web interface that allows white team members to access authoring module 114 in a number of ways, such as wirelessly through tablets and smartphones. The three example steps of the workflow are exercise capture, monitoring planning, and briefing generation.

Exercise capture or creation begins by, e.g., drawing the cyber range network's hosts (e.g., exercise host computing systems 20) and connections using a network builder interface (e.g., a drag-and-drop interface). Once the network topology is captured, the user specifies details for one or more of exercise host computing systems 20. The interface is operable to lead the user through this process starting with high-level information and working down to low-level information. At each step, the interface is populated with options for the user.

As one example, the user may first identify the operating system of a given one of exercise host computing systems 20 by type, flavor, and/or version (e.g., Linux BackTrack or 5 R2, Windows XP or SP3). Second, the user can list the services and applications on the host computing system that are relevant to the exercise scenario. The interface can provide a list of common services and applications for the user to choose from, in certain cases. This may not be a comprehensive accounting of all software on the host computing system, and may only include programs that will come into play during the exercise (e.g., cyber attack or defense tools, network services that the trainees are tasked to protect, or malware). Third, the user may input, in some cases, the user accounts on the host computing system, along with their credentials, which allows agents 14 accessibility to the given host computing system. Fourth, the user may map out one or more virtual networks that implement the exercise scenario. That is, the user may create the virtual networks that integrate with hardware based networks.

Monitoring planning begins with the user providing learning objectives for the exercise. The interface leads the user through a series of steps to produce a detailed monitoring plan. The process is repeated until all learning objectives are covered, with sufficient fidelity for each objective. The iterative process may include the following operations for each objective: (1) identifying a high-level learning objective (e.g., security configuration); (2) identifying one or more skills that support the high-level objective (e.g., how to configure a firewall); (3) defining one or more metrics that can be used to determine if each skill is accomplished (e.g., the iptables firewall configuration is changed to block a port, or a port's state is changed from open to filtered); (4) identifying one or more observables/parameter data (e.g., parameter data 44 shown in FIG. 2) that can be collected from exercised host computing systems 20 to calculate the metrics from the parameter data/observables (e.g., a listing of the iptables configuration before and after a change (two measurements), or execution of the iptables command from the command line (an event)); (5) selecting an agent capable of collecting the parameter data/observables (e.g., a binary execution agent or a file watching agent); and (6) configuring each agent with metric parameters (e.g., metric parameters 42 shown in FIG. 2) for the selected parameter data/observables (e.g., the name of the binary to execute (iptables) and a regular expression (regex) to search for in the results (destination-port {PORT-NUMBER-HERE}-j DROP), or the name of the file to monitor for changes (/home/USERNAME/.bash_history) and a regex to search for in the results (iptables)). The operational mode of the agent, for example, may also be configured to execute measurement and then terminate, or to begin event monitoring then stay resident.

As a final step, white team members may produce a scoring rubric, or an attempt to communicate expectations of quality around a task, to determine how trainee performance will be quantified. The rubric may incorporate the metrics, along with weighted values for each.

One of the potential strengths of cyber exercises is their emergent nature and unpredictability. Scenario system 110 accounts for this by allowing monitoring plans to be modified during exercises. For example, the planning dashboard system of authoring module 114 may be configured to allow the planning dashboard to be re-visited while an exercise is in progress to design new agents on the fly or to adjust the assessment rubric.

Briefing generation is a next step in the process. White team members use the interface provided by assessment system 130 (and/or learning management system 106) to produce dynamic documents (e.g., web pages with configurable content) that can be viewed online or printed out. The full contents of briefing documents are visible to white team members, and filtered versions are made available to trainees or groups of trainees to prepare them for the exercise. The filtering is configurable by the white team so they can control how much information to provide to trainees.

Briefing documents can include information from both the exercise capture step and the monitoring planning step. The dashboard interface is capable, in some instances, of translating the exercise information and monitoring plan files into human-readable form and allows white team users to select which aspects to share with students. The documentation can include information like network topology, scenario backstory, mission objectives, learning objectives, rules, and evaluation criteria. While this information is available to white team members, they can filter out critical information from the trainees' documentation, such as providing only partial network topology or specific scoring metrics.

The following items list some examples of information found in briefings, with examples of how the information could also be filtered for trainees: (a) full scenario description (possible filter: only show trainees the backstory); (b) network topologies (possible filter: only show trainees their local topology); (c) mission objectives; (d) learning objectives; (e) rules (show all); (f) quiz questions (possible filter: only show trainees questions without "spoilers"); and/or (g) performance metrics (possible filter: show none of these to trainees).

Evaluation dashboard module 12 of assessment system 130 is configured to output an evaluation/monitoring dashboard that may be used in real-time during the course of a training exercise. The evaluation/monitoring dashboard may provide one or more user interfaces for each of its operating modes. Each operating mode may, in some cases, have separate views focused on network topology, learning objectives and agent data feeds. Each operating mode has different exercise controls; for example, in live mode, a user can start or stop monitoring, and in replay mode, the user can play back or pause agent telemetry.

In some examples, assessment system 130 outputs agent data in real time and displays it on a network diagram as it is received. For example, evaluation dashboard module 12 may output an evaluation/monitoring dashboard for display to a user (e.g., evaluator, instructor) via, e.g., assessment system 130. When an agent sends new data from a host computing system to the interface (e.g., provided by monitoring and injection control system 4), the representation of that host in the dashboard may blink, and the number of pending agent reports is displayed. Users can click on the representation of the host to drill down to see detailed agent reports for the host.

Figure 4:
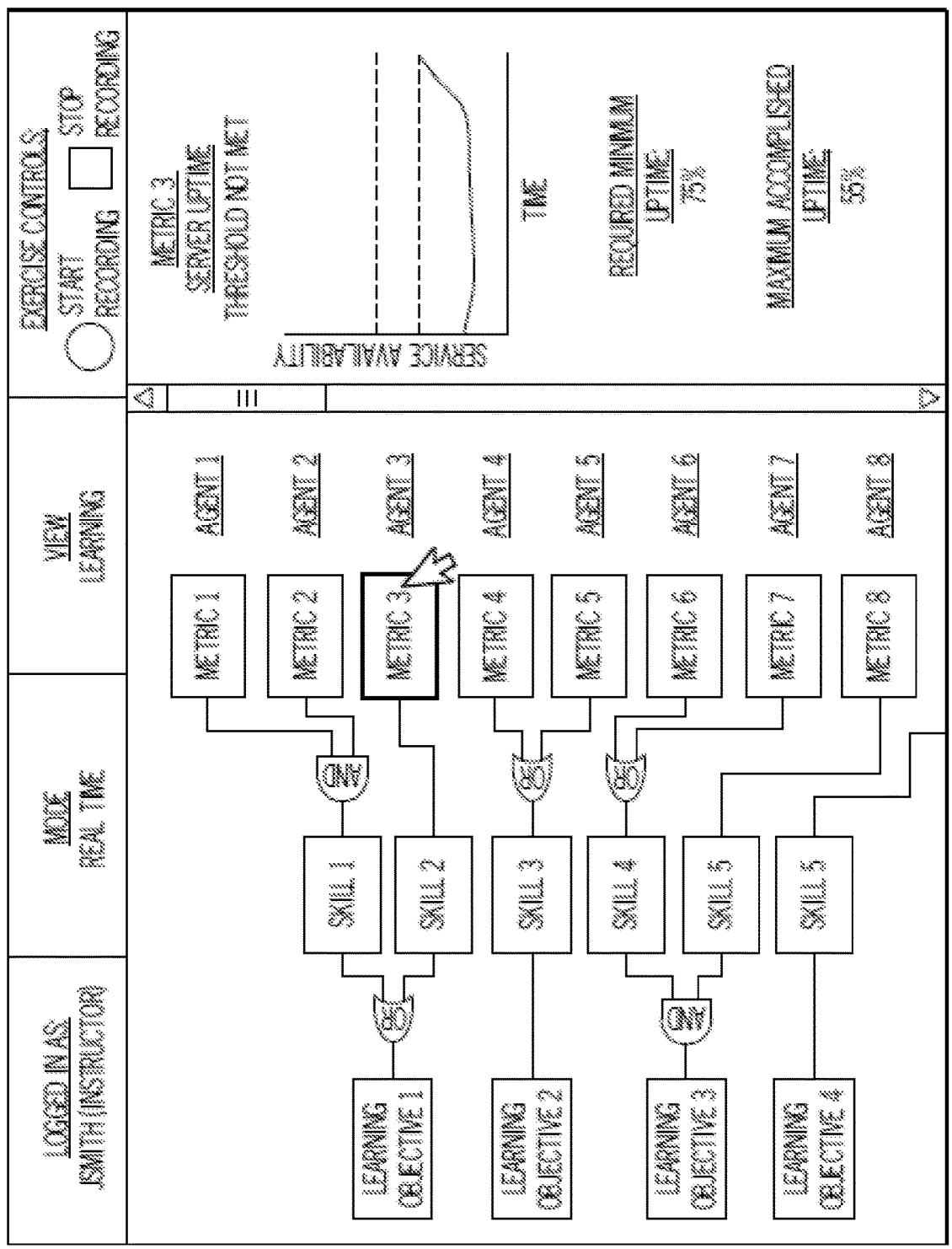
FIG. 4 is a screen diagram illustrating an example evaluation dashboard, in accordance with one or more aspects of the present disclosure.

FIG. 4 is a screen diagram illustrating an example evaluation dashboard, in accordance with one or more aspects of the present disclosure. White team members may use the evaluation dashboard to monitor exercises in real time. The web interface can be accessible from mobile devices such as tablets and smartphones (e.g., assessment system 130 illustrated in FIG. 1), so white team members can "float" during an exercise rather than be tied to a workstation. Once an exercise is over, the metrics collected can be analyzed and even played back on the evaluation dashboard. Finally, white team members can use the evaluation dashboard to produce debriefing or after action "hot wash" reports for trainees, reviewing the exercise and student performance.

The evaluation/monitoring dashboard may be implemented using similar techniques and tools to the planning dashboard. It may include a back end and a front end. In some examples, the evaluation dashboard has three main purposes: to monitor an exercise, assess trainee performance, and prepare debriefing documents. Because data collected by agents during an exercise can be viewed in real time or after the fact, the monitoring and assessment tasks may share the same interfaces. They only differ in whether they are viewing results live or in replay, as indicated in the "Mode" field shown in FIG. 4. Each of these modes will have different controls available to the user.

The dashboard may provide three different views: network, learning, and agent. In some examples, additional views might include an exercise event timeline or advanced assessment analytics. The network view shows the exercise's cyber/test range network and details of the host computing systems included in this network (e.g., details of exercise host computing systems 2). The interface will promote situational awareness on the status and health of the exercise's cyber range infrastructure. The network view shows the exercise host computing systems, their status, and agent activity. Users can drill down into the specifics of an exercise host computing system and its monitoring results by clicking on the host's icon.

The learning view shows the white team what progress the trainees are making towards the exercise learning objectives. It indicates the relationships between learning objectives, skills, and metrics that were created using the evaluation and/or planning dashboard, and may present this information in a directed graph. The graph may indicate one or more hierarchical relationship between nodes, such as between skill nodes and learning objective nodes. The learning view (e.g., graphical tree) enables an instructor to define high level objectives for an exercise, skills that a student should demonstrate that supports those objectives, and agents that report when skills have been demonstrated. The "View" field in the example of FIG. 4 indicates that the dashboard is set for the "Learning" view. The directed graph is displayed on the left of the learning view. Metrics for which threshold values have been met may be marked in a particular color (e.g., green) or other representation (e.g., other graphical indication or emphasis), and this status propagates up the graph to determine which learning objectives are met.

The dashboard may also include one or more operator nodes to represent operations associated with or between objective nodes, skill nodes, and/or metric/agent nodes. These operator nodes may, for example, include nodes representing logical AND or OR operations. As shown in the example of FIG. 4, "Learning Objective 1" may be achieved or completed if either "Skill 1" or "Skill 2" has been demonstrated, while "Learning Objective 3" may only be achieved or completed if both "Skill 4" and "Skill 5" have been demonstrated. "Skill 1" may be demonstrated if both "Metric 1" and "Metric 2" have been collected, observed, or otherwise determined. "Skill 3" may be demonstrated if either "Metric 4" or "Metric 5" have been collected, observed, or otherwise determined, and "Skill 4" may be demonstrated if either "Metric 6" or "Metric 7" have been collected, observed, or otherwise determined.

In the example of FIG. 4, metrics for which threshold values have been met are "Metric 1," "Metric 2," "Metric 4," and "Metric 7." Accordingly, "Skill 1", "Skill 3," and "Skill 4" have been demonstrated, and both "Learning Objective 1" and "Learning Objective 2" have been completed or achieved.

Clicking on a metric will display details of that metric on the right side of the learning view, including the current value of the metric and the success threshold identified in the evaluation rubric (defined in the planning stage), and an indication of whether the threshold has been satisfied. In the example of FIG. 4, a user has clicked on a representation of "Metric 3," and the details of "Metric 3" are shown on the right side of the learning view, indicating that the server uptime threshold has not been met, because the required minimum uptime is 75%, while the maximum accomplished uptime is only 55% (at a given time in the exercise). A graph showing service availability versus time is also shown.

Clicking on an "Agent" hyperlink next to a metric may take the user into the agent view. The agent view lets white team members view exercise state at, e.g., a lowest possible level of individual monitoring agents. The view shows the configuration of an agent, its parameters, its current status, and its raw data feed. This may be the same interface used in the testing phase of exercise planning, and as such it can also be used to troubleshoot or modify agents. One example of a configuration of an agent is shown in FIG. 6, which may allow a user to provide details regarding the agent parameters, such as agent options and evaluation criteria. The agent view may show this configuration information along with current status of the agent.

In some examples, agents are associated with metric and/or skill nodes in the directed graph. Selecting an agent may be based upon corresponding skills that are to be demonstrated during a training exercise and/or upon corresponding metrics that are calculated from data provided by an agent. In the example of FIG. 4, "Agent 1" may provide data used to determine "Metric 1," "Agent 2" may provide data used to determine "Metric 2," "Agent 3" may provide data used to determine "Metric 3," "Agent 4" may provide data used to determine "Metric 4," "Agent 5" may provide data used to determine "Metric 5," "Agent 6" may provide data used to determine "Metric 6," "Agent 7" may provide data used to determine "Metric 7," and "Agent 8" may provide data used to determine "Metric 8."

"Agent 1" and "Agent 2" may provide data associated with "Skill 1" based upon "Metric 1" and "Metric 2." "Agent 3" may provide data associated with "Skill 2." "Agent 4" and "Agent 5" may provide data associated with "Skill 3." "Agent 6" and "Agent 7" may provide data associated with "Skill 4." And, "Agent 8" may provide data associated with "Skill 5."

As shown in FIG. 4 in the field "Exercise Controls," a user may select a first displayed element to start recording activities/events of a particular exercise, which will cause assessment system 130 to record and store such activities/events (e.g., in database 8C) for later use and/or retrieval. The user may also select a second displayed element to stop recording such activities/events.

Figure 8:
FIG. 8 is a screen diagram illustrating example exercise results that may be provided by the evaluation dashboard, in accordance with one or more aspects of the present disclosure.
Figure 11:
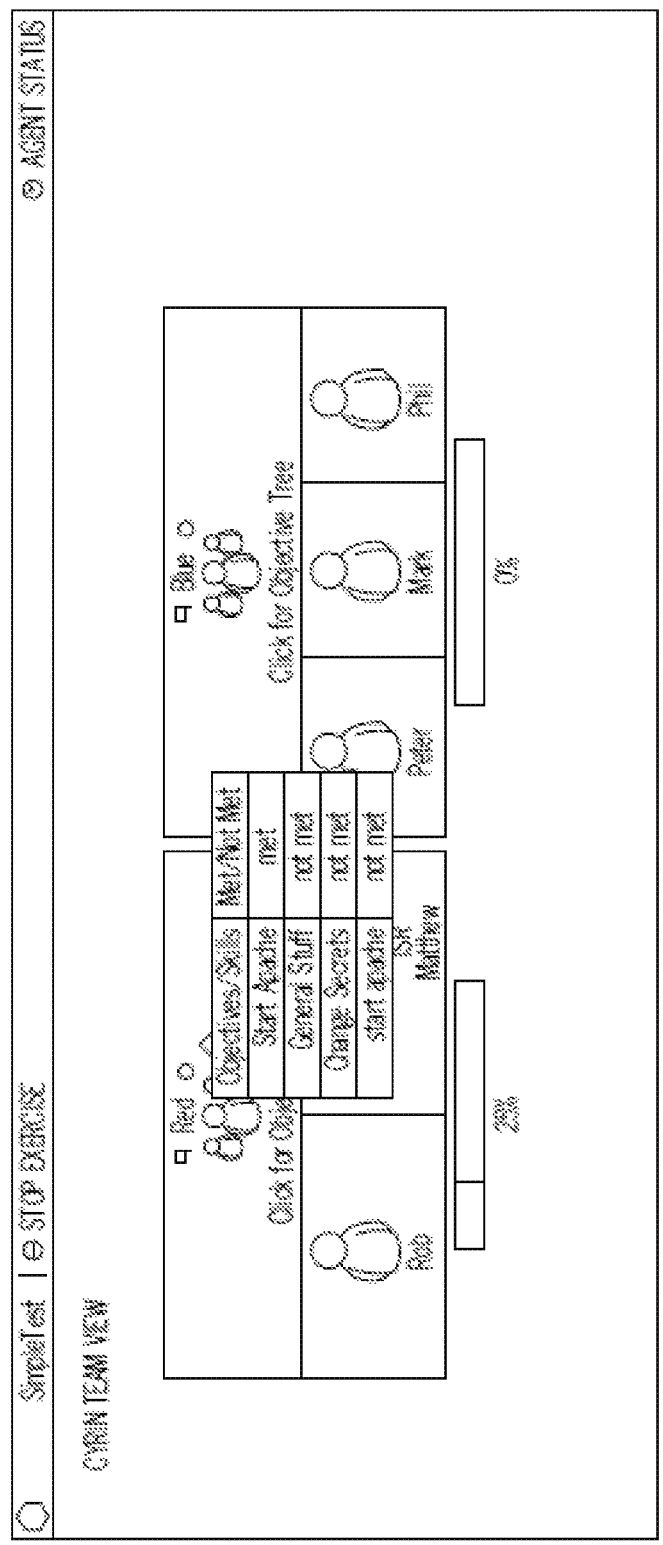
FIG. 11 is a screen diagram illustrating example team exercise results that may be provided by the evaluation dashboard, in accordance with one or more aspects of the present disclosure.
Figure 13:
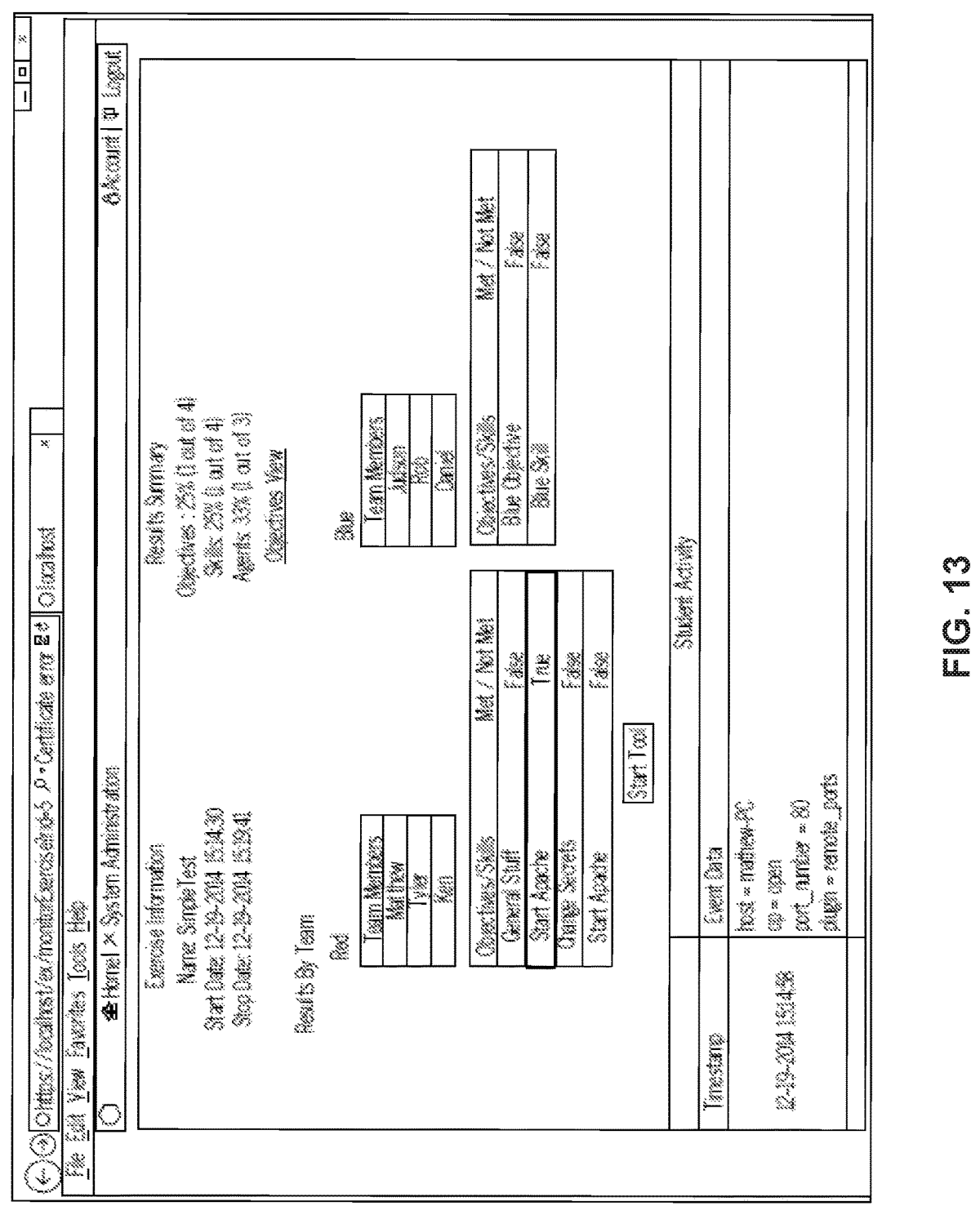

As with the evaluation and/or planning dashboard, the final step of the evaluation/monitoring dashboard is to generate debrief documentation for the white team and trainees. It will draw primarily from the monitoring results and monitoring plan, but also draw from the captured exercise information to provide context. Debrief documents are dynamic web pages, so they can be viewed online or printed out, and they can be filtered by the white team for trainee viewing. The content may focus on the skills and metrics that were and were not achieved by trainees, and how they relate to the high-level learning objectives. The debrief web pages can configured as live scoreboards during exercises. This may be appropriate for certain types of cyber exercises, such as capture the flag style competitions. FIGS. 8, 11, and 13, as will be described in more detail below, provide examples of the type of information that may be provided by debriefing documents.

Figure 5:
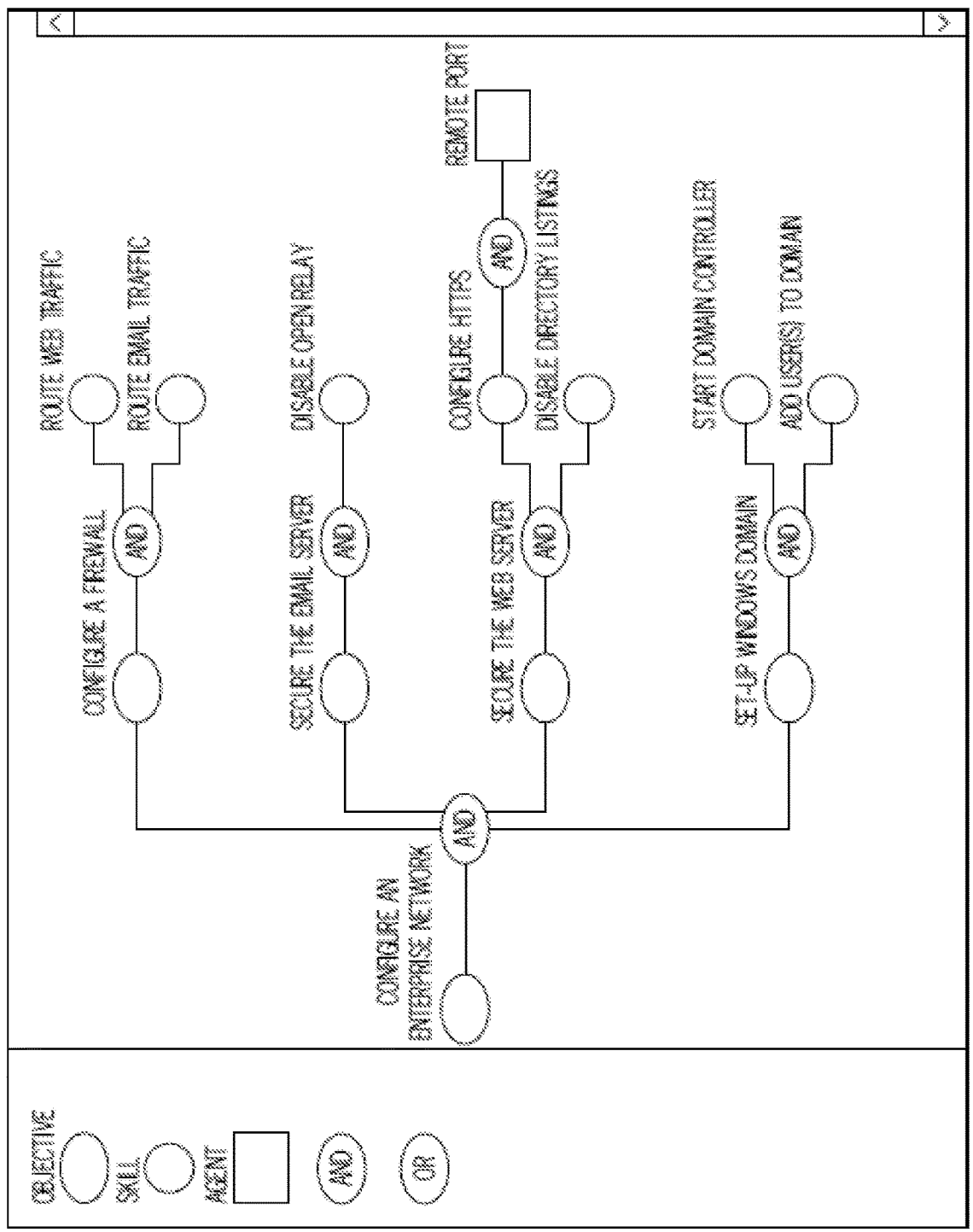
FIG. 5 is a screen diagram illustrating another example of a learning view (e.g., graphical tree) that may be included or otherwise provided by the evaluation and/or planning dashboard, in accordance with one or more aspects of the present disclosure.

FIG. 5 illustrates another example of a learning view (e.g., graphical tree) that may be included or otherwise provided by the evaluation and/or planning dashboard. In some examples, the dashboard may provide the learning view as a learning objective tree with multiple nodes that represent objectives, skills, agents, and operators (e.g., logical AND or OR operators). These nodes may be referred to as learning objective nodes, skill nodes, agent nodes, and operator nodes, respectively. A user may select (e.g., drag and drop) these nodes into the dashboard workspace to build the learning objective tree.

Learning objective nodes (e.g., ovals) represent high-level goals or objectives for the training exercise of the student. As indicated above, learning objectives can be multilevel. Skill nodes (e.g., circles) represent concrete, but potentially still high level, actions the student should take during the exercise. For example, as part of the "Set up Windows domain" objective, the student should add users to the domain controller. Agent nodes (e.g., squares) represent configurable software components, or agents, that monitor and report activity on host computing systems (e.g., host computing systems 20) in an exercise. Operator nodes (e.g., oval-shaped operator nodes representing logical operations) represent operations associated with or between objective nodes, skill nodes, and/or agent nodes in the learning objective tree.

The example learning objective tree illustrated in FIG. 5 may be built from a root learning objective node(s) (e.g., objective node labelled "Configure an enterprise network" in FIG. 5) to one or more "leaf" agent nodes (e.g., agent node labelled "Remote Port" in FIG. 5). To start building a tree, or to add to an existing tree, a user may drag a node from the palette on the left into the workspace. The user may also form associations between nodes by placing or inserting connections (e.g., lines or other similar connectors) between nodes, as illustrated in FIG. 5.

The user may place one or more constraints on the tree or to hierarchical relationships between tree nodes, and the nodes may form a hierarchy of parent and children nodes. In some cases, the dashboard and/or learning view may enforce certain rules when a user builds a hierarchy of tree nodes. One non-limiting set of rules are shown in Table 1 below:

TABLE 1

EXAMPLE RULES/POLICY FOR NODE HIERARCHY

| Parent Node | Children Nodes |
|---|---|
| Objective | Objectives |
| | AND/OR |
| | Skills |
| Skill | AND/OR |
| | Agents |
| Agent | No child nodes allowed |

As shown in Table 1, no child nodes are allowed for agent parent nodes. Skill nodes may have agent nodes and/or operator nodes as child nodes. Objective nodes may have other objective nodes, skill nodes, and/or operator nodes as child nodes.

In the example of FIG. 5, based on the node configuration and hierarchies, the objective "configure a firewall" is achieved if both the skills "route web traffic" and "route email traffic" have been demonstrated. The objective "secure the email server" is achieved if the skill "disable open relay" is demonstrated. The objective "secure the web server" is achieved is both the skills "configure HTTPS" and "disable directory listings" have been demonstrated. The skill "set up windows domain" is achieved if both the skills "start domain controller" and "add user(s) to domain" have been demonstrated. And, the objective "configure an enterprise network" is only achieved if each of the objectives "configure a firewall," "secure the email server," "secure the web server," and "set up windows domain" have been achieved.

FIG. 6 is a screen diagram illustrating an example agent configuration form. As described above, each agent may be configurable to perform different tasks. A user (e.g., trainer, evaluator) may use the agent configuration form to set up or otherwise configure an individual agent.

In section (1) of the form, the user may select an individual agent (e.g., enter a new agent name of select the type of agent from a drop-down menu). In the example of FIG. 6, the user has selected the agent named "File System Monitor." The contents fields or sections named "Agent Options" (3) and "Evaluation Criteria" (4) in the form may change based on which agent is selected.

In section (2) of the form, the user may specify the number of points earned by the student when the agent returns data that is evaluated to true. Using section (3), the user may specify various options for an agent. The fields in section (3) determine how the agent runs and what data it looks for. In the example of FIG. 6, the File System Monitor agent monitors the indicated Directory using the indicated file name filter. Agent options can be numbers, strings, or regular expressions.

In section (4) of the form, the user may specify various evaluation criteria for the agent. The evaluation criteria section allows the user to identify what data is used to evaluate student performance. This is discussed in more detail below. In section (5) of the form, a drop-down menu is provided to select which computer in the exercise network (e.g., one or more of exercise host computing systems 20) the agent should be sent to.

Regarding the agent evaluation criteria, each agent may be configured to return tagged data that can be used to determine if the student actions are correct. FIG. 6 shows example evaluation criteria section for the "File System Monitor" agent. Each piece of tagged data returned by an agent can be evaluated to either True or False. In this example, the "File System Monitor" returns four pieces of tagged data (the labels in FIG. 6 are the tags used by the agent): "path," "status," "renamed_to," and "change_type." The center column is a drop-down menu with evaluation operations. Agents return either strings or numbers and the evaluation operations available reflect the data type.

To evaluate strings, example operations are the following: (a) "Contains": the Contains operation returns True if the data contains the user-specified substring; (b) "Equals": the Equals operation returns True if the data is the same as the user-specified string; and (c) "Not Equals": the Not Equals operation returns True if the data is different from the user-specified string.

To evaluate numbers (e.g., integers), example available operations are the following: (a) "Equals;" (b) "Not Equals;" (c) "Less than;" (d) "Greater than;" (e) "Less than or equal to;" and (f) "Greater than or equal to."

In various examples, during evaluation of agent data, the value of each field may be checked or monitored. If each operation results in True, then the agent as a whole evaluates to True.

Figure 7:
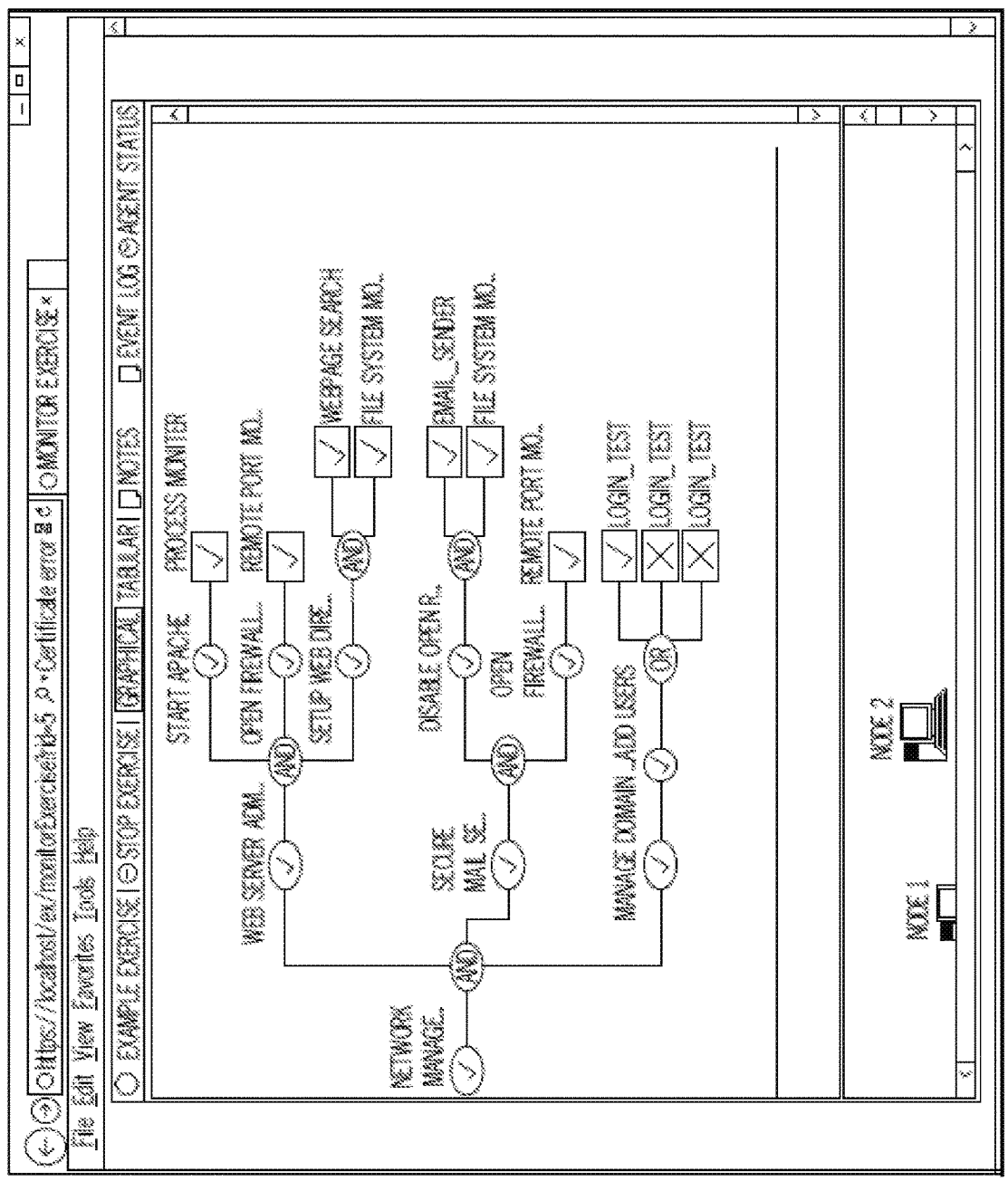
FIG. 7 illustrates another example of a learning view (e.g., graphical tree) that may be included or otherwise provided by the evaluation dashboard, in accordance with one or more aspects of the present disclosure.

FIG. 7 illustrates another example of a learning view (e.g., graphical tree) that may be included or otherwise provided by the evaluation dashboard. In the example of FIG. 7, the learning view may be updated during the course of an exercise as one or more agents send parameter data (e.g., parameter data 44 of FIG. 2) to assessment system 130, and determine whether agent evaluation criteria have been satisfied, and accordingly whether one or more skills have been demonstrated or objectives achieved. Initially, the learning objective, skill, and agent nodes may be displayed in an initial representation or color (e.g., red) and/or have an "X" displayed in them to graphically indicate that the represented objective has not been accomplished, the represented skill has not been yet demonstrated, and/or the represented agent has not yet collected and/or provided parameter data that satisfies the corresponding criteria.

As the agents return parameter data that evaluate to True, based on the evaluation criteria, the learning objective tree is evaluated and nodes change to another color (e.g., green) and/or change the "X" within the respective nodes to a checkmark, graphically indicating a true, or "pass," evaluation. The screen diagram illustrated in FIG. 7 shows a more complicated learning objective tree with evaluated results.

In some examples, learning objective trees follow standard logic rules for "AND" and "OR" operators. For an "AND" operator, and for a given node N, N is true if and only if all child nodes are true. For an "OR" operator, and for a given node N, N is true if one or more children nodes are true.

In the example illustrated in FIG. 7, many of the objective nodes, skill nodes, and agent nodes have checkmarks included inside the respective nodes (and may, in some cases, be colored green), indicating that represented objectives have been accomplished, represented skills have been demonstrated, or that represented parameter data provided by an agent satisfies corresponding evaluation criteria. However, two agent nodes in FIG. 7 have an "X" displayed in them, indicating that the parameter data provided by these represented agents has not satisfied the corresponding evaluation criteria.

FIG. 8 is a screen diagram illustrating example exercise results that may be provided by the evaluation dashboard. The exercise results page shows an exercise report of a summary of a student's performance along with a breakdown of which objectives, skills, and agents evaluated to true. In the example of FIG. 8, the page includes a "Results Summary" section that includes a summary of the number and percentage of objectives, skills, and agents have evaluated to true in the learning view/graphical tree. Below the "Results Summary" is an itemized list of objectives, skills, and agents, as well as an indication as to whether each objective, skill, or agent has evaluated to true (e.g., objective achieved or accomplished, skill demonstrated, agent parameter data satisfied one or more evaluation criteria) or false. In the section "Student Activity," the exercise results page lists specific event parameter data that has been collected and/or provided by one or more agents. Each group of event data may have an associated timestamp that corresponds to a time at which the event data was collected.

Figures 9, 10:
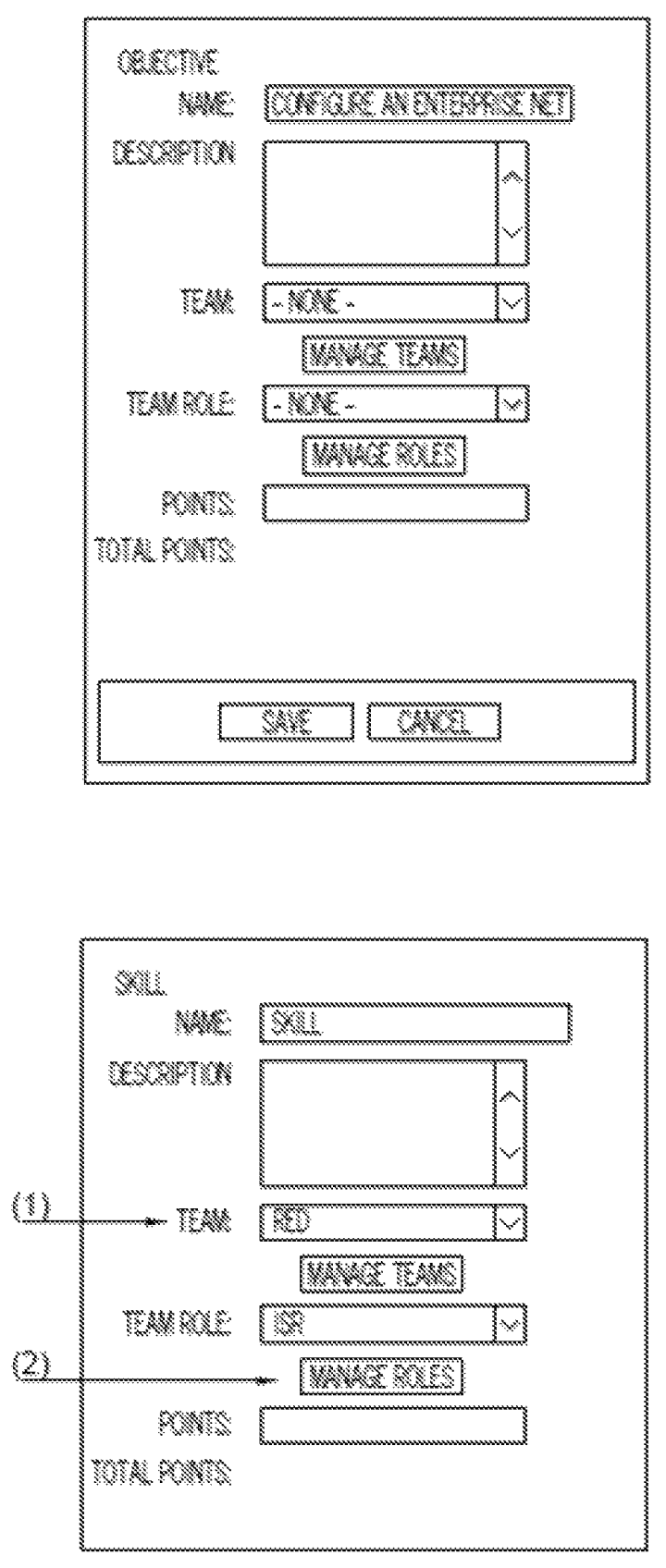

FIGS. 9 and 10 are screen diagrams illustrating example forms for assigning teams to objectives or skills. For given exercises, an individual trainee may perform one or more actions and be evaluated accordingly using the evaluation dashboard. However, in certain exercises, one or more teams of trainees may be created and assigned to selected objectives and/or skills.

In the example of FIG. 9, a user (e.g., evaluator) may enter or select a descriptive name for the objective node that represents a given objective in the "Name" section, and may also supply a more verbose description of the objective in the "Description" section. In the "Team" section, the user may supply or otherwise select the name of the team that is responsible for this objective. However, the "Team" section may also be left blank (e.g., "none") if no particular team is to be assigned to the indicated objective.

In some examples, in addition to the use of teams, individual trainees within a given team may be assigned one or more team roles. In the "Team Role" section illustrated in FIG. 9, a particular team role may be assigned to the corresponding objective, indicating the team role that is responsible for this objective. However, the section "Team Role" may be left blank if no particular role is to be assigned to the indicated objective. In the "Points" section, the number of points earned by a trainee/student (or team) when the objective is achieved may be specified. The "Total Points" section indicates the sum of points for all of this node's children, which includes the points assigned to this node.

FIG. 10 illustrates a similar example of how a team and/or team role may be assigned to a given skill. In the "Team" section (1) of the form illustrated in the example of FIG. 10, the indicated team is "Red." Section (2) of the form provides a "Manage Roles" button that may be activated by a user to further define and/or manage roles associated with the "Red" team. In the "Team Role" section, the role "ISR" has been selected. Accordingly, in this example, the member of team "Red" having the role of "ISR" is assigned to the indicated skill.

FIG. 11 is a screen diagram illustrating example team exercise results in a team exercise summary report that may be provided by the evaluation dashboard, in accordance with one or more aspects of the present disclosure. In the particular example of FIG. 11, two teams have been created: the "Red" team and the "Blue" team. The two members, or trainees, of the "Red" team are "Rob" and "Matthew," while the three members of the "Blue" team are "Peter," "Mark," and "Phil." As indicated in the example of FIG. 11, the member of the "Red" team named "Matthew" has an assigned role on the team of "ISR."

When a scheduled exercise is run and students are assigned to teams, such as shown in FIG. 11, the main monitoring screen is the Team View. Overall progress is displayed below the team table. For example, FIG. 11 illustrates that only 25% of the learning objectives and/or skills have been accomplished/demonstrated for the "Red" team, while 0% of the objectives and/or skills have been accomplished/demonstrated by the "Blue" team.

Figure 12:
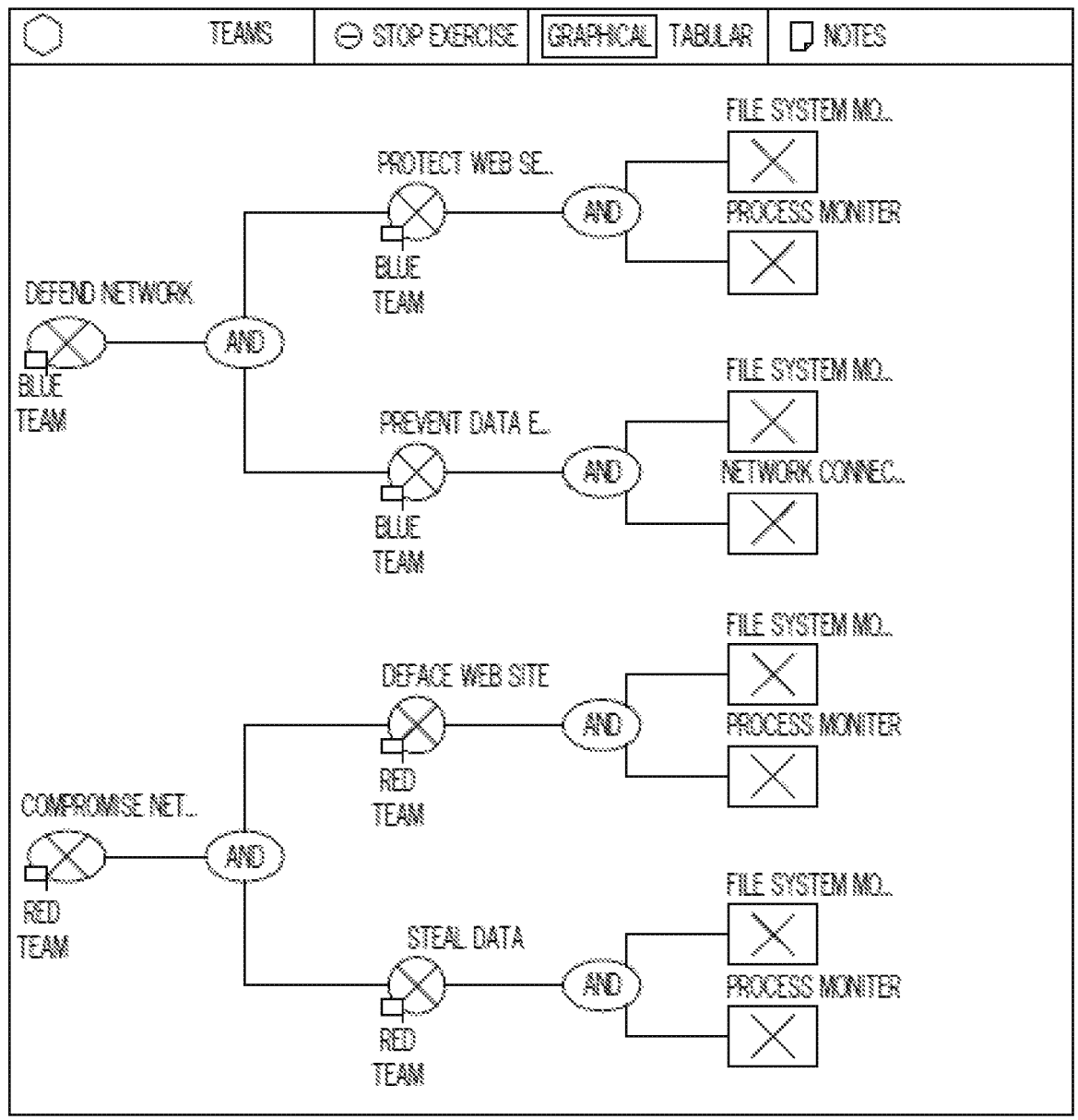
FIG. 12 is a screen diagram illustrating another example of a learning view (e.g., graphical tree) that may be included or otherwise provided by the evaluation dashboard, in accordance with one or more aspects of the present disclosure.

A user may click on the sections displaying the names of the "Red" and "Blue" teams, respectively, to view the objective learning tree for the real-time evaluation dashboard, such as shown in FIG. 12. Additionally, in the Team View, a user may also select an option to view individual objectives and/or skills that have been met or not met, such as in a drop-down menu or field. In the example of FIG. 11, the objectives and skills of the "Red" team are illustrated. In particular, the objective/skill of "Start Apache" is currently met, while the objectives/skills of "General Stuff," "Change Secrets," and "Start Tool" are not met. As only one of the four objectives/skills are met, only 25% of the objectives/skills have been satisfied, as indicated for this particular example.

FIG. 12 is a screen diagram illustrating another example of a learning view (e.g., graphical tree) that may be included or otherwise provided by the evaluation dashboard, in accordance with one or more aspects of the present disclosure. When running a team exercise, the learning objective and skill nodes display the team flag. The learning view of FIG. 12 is similar in format to that shown in the example of FIG. 7, where individual nodes have a particular color or include an "X" for corresponding objectives that have not yet been accomplished, skills that have not yet been demonstrated, and/or agents whose evaluation criteria have not yet been satisfied. In addition, logical operators (e.g., "AND" operators, "OR" operators) may be associated with one or more of the nodes in the hierarchy.

However, individual nodes may be assigned to teams within the tree. In particular, learning objective nodes and skill nodes may be assigned to teams, based upon which corresponding objectives and skills have been assigned to teams (e.g., such as described in reference to FIGS. 9 and 10). In the particular example of FIG. 12, the objective of "Defend Network" is assigned to the "Blue" team, as indicated by text and/or a blue flag (or other representation associated with the "Blue" team), which is located adjacent to the learning objective node representing the "Defend Network" objective, as indicated in FIG. 12. The objective of "Compromise Net . . . " (Compromise Network) is assigned to the "Red" team, as indicated by text and/or a red flag (or other representation associated with the "Red" team), which is located adjacent to the learning objective node for the "Compromise Net . . . " learning objective.

Similarly, the skills of "Protect Web Se . . . " and "Prevent Data E . . . " are assigned to the "Blue" team, as indicated by text and/or blue flags (or other representations associated with the "Blue" team), which are located adjacent to the skill nodes representing the "Protect Web Se . . . " and "Prevent Data E . . . " skills. The skills of "Deface Web site" and "Steal Data" are assigned to the "Red" team, as indicated by text and/or red flags (or other representations associated with the "Red" team), which are located adjacent to the skill nodes representing the "Deface Web site" and "Steal Data" skills.

FIG. 13 is a screen diagram illustrating an example of detailed team exercise results that may be provided by the evaluation dashboard, in accordance with one or more aspects of the present disclosure. The exercise results page illustrated in FIG. 13 shows an exercise report of a summary of each team's performance along with a breakdown of which objectives, skills, and/or agents evaluated to true. In the example of FIG. 13, the page includes a "Results Summary" section that includes a summary of the number and percentage of objectives, skills, and/or agents that have evaluated to true in the learning view/graphical tree. These results may be specific to a particular team (e.g., the "Red" team or the "Blue" team), or the results may comprise a combined set of results for all teams.

Below the "Results Summary" is an itemized list of objectives, skills, and agents, as well as an indication as to whether or not each objective, skill, or agent has evaluated to true (e.g., objective achieved or accomplished, skill demonstrated, agent parameter data satisfied one or more evaluation criteria), for each individual team, and the team members of each team are also shown. In the section "Student Activity," the exercise results page lists specific event parameter data that has been collected and/or provided by one or more agents. Each group of event data may have an associated timestamp that corresponds to a time at which the event data was collected. The event data may be specific to members of a particular team or may, in some cases, comprise combined data for both teams.

Figure 14:
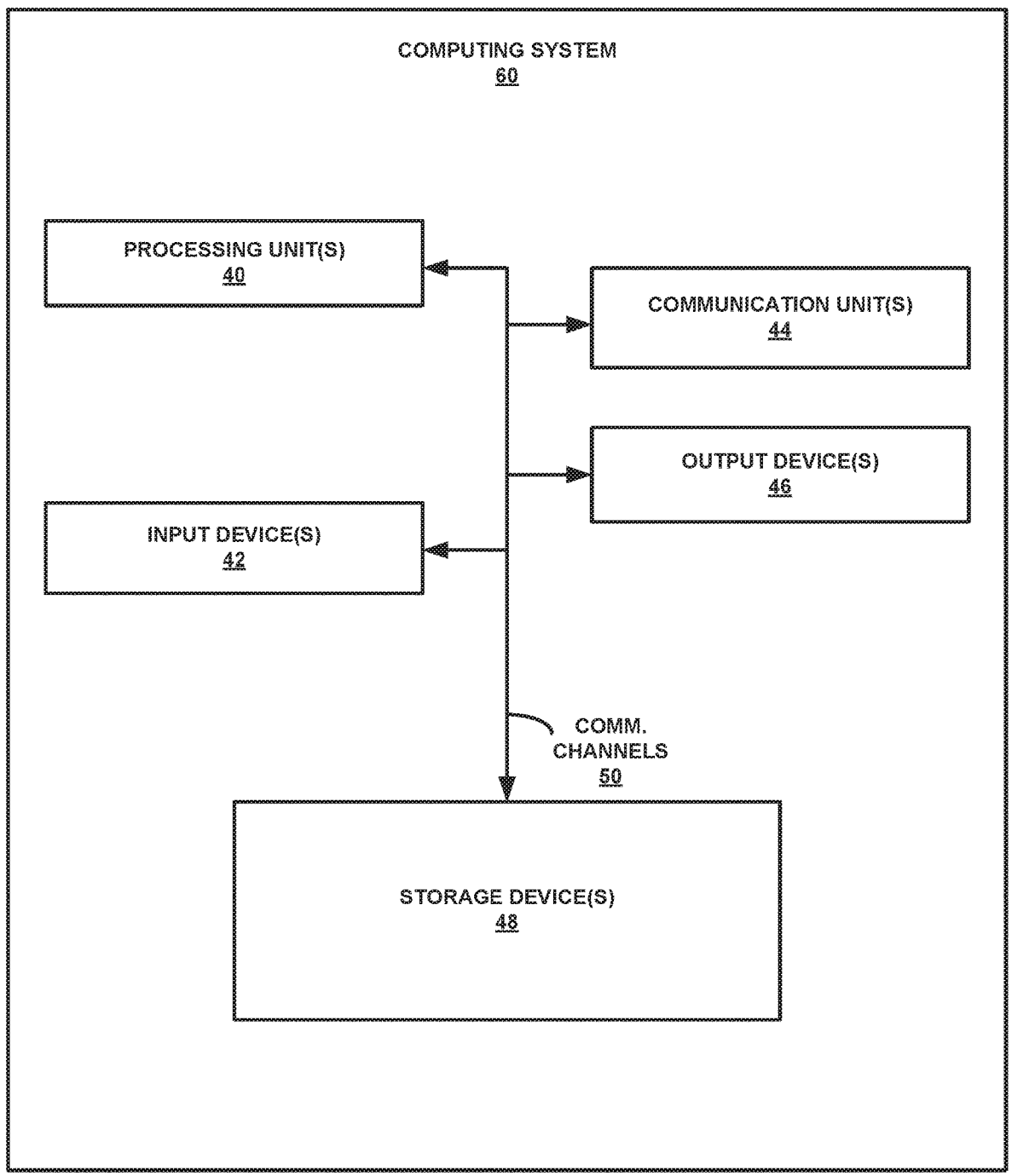
FIG. 14 is a block diagram illustrating further details of an example computing system, in accordance with one or more aspects of the present disclosure.

FIG. 14 is a block diagram illustrating further details of an example computing system 60, such as one or more of the computing systems (e.g., learning management system 106, scenario system 110, assessment system 130, exercise host computing system 20A-20N) shown in FIGS. 1-2, in accordance with one or more aspects of the present disclosure. FIG. 14 illustrates only one particular example of computing system 60, and many other examples of computing system 60 may be used in other instances and may include a subset of the components shown, or may include additional components not shown, in FIG. 14.

As shown in the example of FIG. 14, computing system 60 includes one or more processing units 40, one or more input devices 42, one or more communication units 44, one or more output devices 46, and one or more storage devices 48. Communication channels 50 may interconnect each of the components 40, 42, 44, 46, and 48 for inter-component communications (physically, communicatively, and/or operatively). In some examples, communication channels 50 may include a system bus, a network connection, an inter-process communication data structure, or any other method for communicating data between hardware and/or software.

One or more input devices 42 of computing system 60 may receive input. Examples of input are tactile, audio, and video input. Examples of input devices 42 include a presence-sensitive screen, touch-sensitive screen, mouse, keyboard, voice responsive system, video camera, microphone or any other type of device for detecting input from a human or machine.

One or more output devices 46 of computing system 60 may generate output. Examples of output are tactile, audio, and video output. Examples of output devices 46 include a presence-sensitive screen, sound card, video graphics adapter card, speaker, cathode ray tube (CRT) monitor, liquid crystal display (LCD), or any other type of device for generating output to a human or machine. Output devices 46 may include display devices such as cathode ray tube (CRT) monitor, liquid crystal display (LCD), or any other type of device for generating tactile, audio, and/or visual output.

One or more communication units 44 of computing system 60 may communicate with one or more other computing systems or devices via one or more networks by transmitting and/or receiving network signals on the one or more networks. Examples of communication unit 44 include a network interface card (e.g. such as an Ethernet card), an optical transceiver, a radio frequency transceiver, or any other type of device that can send and/or receive information, such as through a wired or wireless network. Other examples of communication units 44 may include short wave radios, cellular data radios, wireless Ethernet network radios, as well as universal serial bus (USB) controllers.

One or more storage devices 48 within computing system 60 may store information for processing during operation of computing system 60 (e.g., computing system 60 may store data accessed by one or more modules, processes, applications, or the like during execution at computing system 60). In some examples, storage devices 48 on computing system 60 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art. In some cases, storage devices 48 may include redundant array of independent disks (RAID) configurations and one or more solid-state drives (SSD's).

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with one or more software/firmware elements or modules.

For example, when computing system 60 comprises an example of learning management system 106, scenario system 110, or assessment system 130 shown in FIG. 1 and/or, storage devices 48 may store instructions and/or data associated with databases 8, agents 14, web server 6, authoring module 114, execution module 116, evaluation dashboard module 12, hypervisor-specific functions 30, metric plugins 32, and/or operating system-specific library 34.

Computing system 60 further includes one or more processing units 40 that may implement functionality and/or execute instructions within computing system 60. For example, processing units 40 may receive and execute instructions stored by storage devices 48 that execute the functionality of the elements and/or modules described herein. These instructions executed by processing units 40 may cause computing system 60 to store information within storage devices 48 during program execution. Processing units 40 may also execute instructions of the operating system to perform one or more operations described herein.

Figure 15:
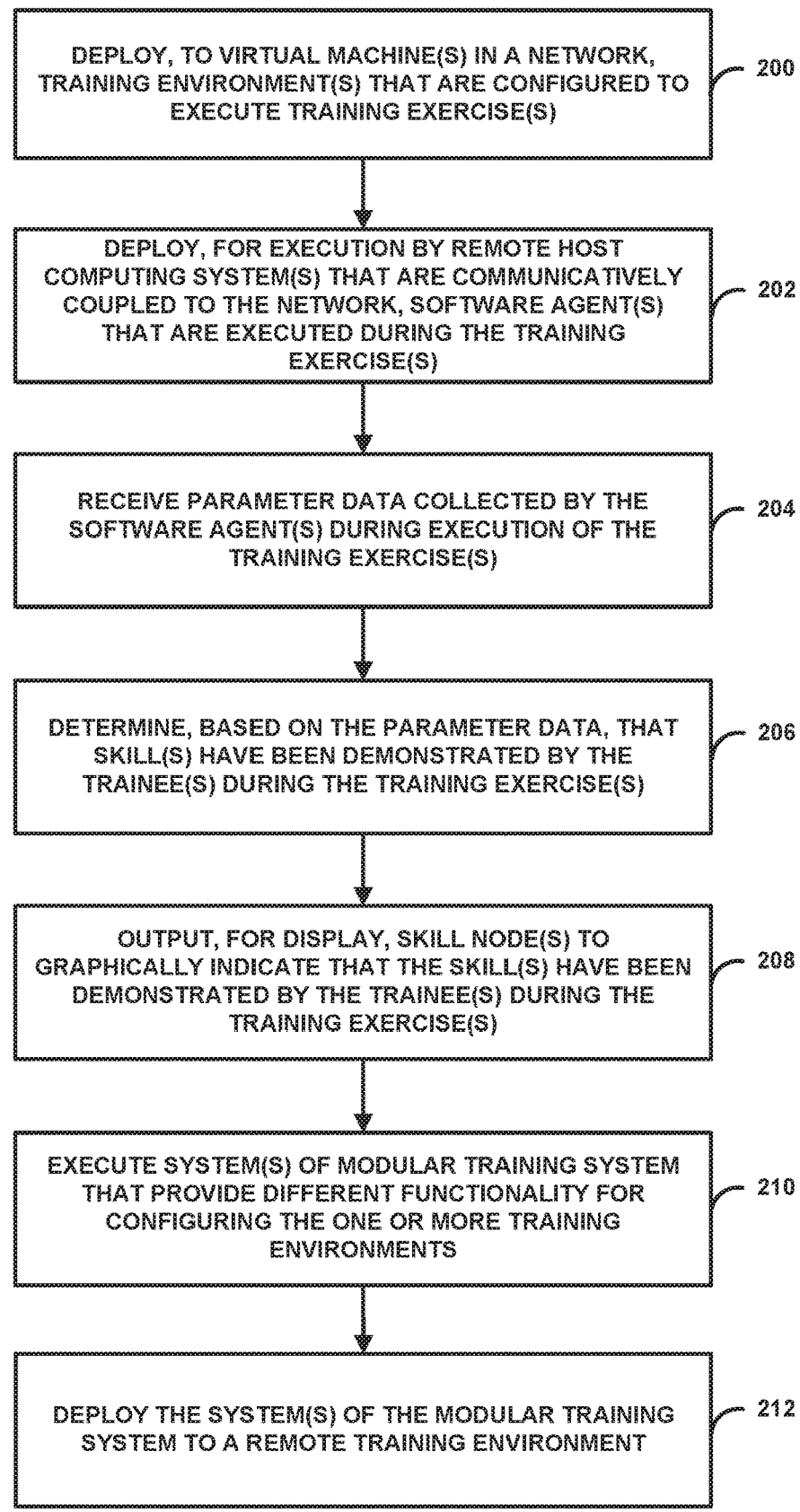
FIG. 15 is a flow diagram illustrating an example process that may be performed by a modular training system, in accordance with one or more aspects of the present disclosure.

FIG. 15 is a flow diagram illustrating an example process that may be performed by a modular training system, such as modular training system 100 illustrated in FIG. 1. As indicated in the example of FIG. 15, the example process includes operations 200, 202, 204, 206, 208, 210, and 212.

For example, the illustrated process includes deploying, to one or more virtual machines in a network, one or more training environments that are configured to execute one or more training exercises (200).

The example process further includes deploying, for execution by one or more remote host computing systems that are communicatively coupled to the network, one or more software agents that are executed during the one or more training exercises (202), where the one or more software agents are configured to collect parameter data from the one or more remote host computing systems while the one or more trainees perform actions during the training exercise.

The example process further includes receiving parameter data collected by the one or more software agents during execution of the one or more training exercises (204).

The example process further includes determining, based on the parameter data, that one or more skills have been demonstrated by the one or more trainees during the one or more training exercises (206), and, responsive to determining that the one or more skills have been demonstrated, outputting, for display, one or more skill nodes to graphically indicate that the one or more skills have been demonstrated by the trainee during the training exercise (208).

The example process further includes executing, by the modular training system, one or more systems of the modular training system that provide different functionality for configuring the one or more training environments (210), and deploying, by the modular training system, the one or more systems of the modular training system to a remote training environment (212).

Further Non-Limiting Examples of Agents/Metric Plugins

As described above, various different agents and/or metric plugins may be utilized with one or more techniques of the present disclosure to provide parameter data (e.g., observables) to exercise management server 2 for processing. The following paragraphs below and corresponding tables describe a set of non-limiting example agents and/or metric plugins that may be used. The "Evaluation Criteria" section of each table lists the fields that the plugin returns, the data type of each field, and a description of what the data represents.

Process Monitor

The process monitor plugin monitors running processes on a computer (e.g., one of exercise host computing systems 20) and reports when processes whose name matches a user-specified pattern starts and stops.

TABLE 2

| PROCESS MONITOR | | |
|---|---|---|
| Supported Platforms: | Windows | Linux 32-bit, 64-bit |
| Options | | |
| Process Name | string | Name of the process to monitor. This plugin uses a substring match, so values such as note, notepad, and notepad.exe will all match. The match is case-insensitive. |

TABLE 2-continued

| PROCESS MONITOR | | |
|---|---|---|
| Supported Platforms: | Windows | Linux 32-bit, 64-bit |
| Poll Interval | Integer | Polling interval in seconds. The default polling interval is 5 seconds |
| Randomize Polling Interval | Boolean | If true, the plugin will look for the specified process at random intervals up to the specified polling interval. |
| Evaluation Criteria | | |
| op | String | Indicates whether the process is running ("started") or halted ("stopped"). |
| pid | Integer | Process identifier of the running |
| cmd | String | The command that was executed. Depending on the OS, this may include all the flags passed to the process. |
| owner | String | Username of the user that 'owns' the process. |
| creation_time | String | Operating system timestamp taken when the |

File System Monitor

The file system monitor reports changes to files in a specific directory (and all sub-directories).

TABLE 3

| FILE SYSTEM MONITOR | | |
|---|---|---|
| Supported Platforms: | Windows | Linux 32-bit, 64-bit |
| Options: | | |
| Directory | String | The full path to the directory that is being monitored |
| File name filter | Regular expression | A regular expression that describes the file (or files) that should be reported. This plugin uses perl-compatible regular expression (PCRE) syntax. For example, to monitor files ending with a .txt extension, the regular expression should like this: .*\.txt A discussion of PCRE syntax canbe found here: http://www.regextester.com/ pregsyntax.html |
| Evaluation Criteria | | |
| Path | String | Full path to the file that has changed |
| Status | String | Indicates whether the file was changed or renamed. Values are either "changed" or "renamed" |
| renamed_to | String | If the status field is "renamed", this field contains the full path to the new file |
| change_type | String | Indicates what type of change happened to the file. Values are either "Created", "Modified", or "Deleted" |

Logon Test

This plugin attempts to create a session (i.e., log in) with the user-specified log-in credentials.

TABLE 4

LOGON TEST

| | | |
|---|---|---|
| Supported Platforms: | Windows | |
| Options: | | |
| User | String | username |
| Domain | String | Windows domain that the specified user is part of. Use '.' if a domain is not being used. |
| Password | String | Password for the user account |
| Retry | Boolean | Indicates whether the plugin should attempt to login once (if this field is false) or try repeatedly until successful. |
| Poll | Integer | Amount of time (in milliseconds) to wait between retry attempts. If Retry is false, this field is ignored. |
| Evaluation Criteria | | |
| login | String | Login attempt result. Values are either "success" or "fail". |
| username | String | Username and domain of the account |

E-Mail Sender

The email sender plugin attempts to send a "test" email message to a specified Simple Mail Transfer Protocol (SMTP) server.

TABLE 5

E-MAIL SENDER

| | | |
|---|---|---|
| Supported Platforms | Windows | |
| Options | | |
| From | String | Email address to use in "from" field. |
| To | String | Destination email address |
| Server | String | SMTP server to connect to |
| Message | String | Optional message to include in the email. If this is not specified, the message will be (e.g.): Meeting at 10 AM, will you be attending? |
| Subject | String | Optional subject to include in the email. If this is not specified, the subject will be (e.g.): Meeting Request |
| Retry | Boolean | If true, the plugin attempts to send the email every 15 seconds. |
| Evaluation Criteria | | |
| Send | String | Indicates either "success" or "fail". |

Network Connection List

This plugin lists all active network connections on a host.

TABLE 6

NETWORK CONNECTION LIST

| | | |
|---|---|---|
| Supported Platforms | Windows | Linux 32-bit, 64-bit |
| Options: | | |
| printTCP | Boolean | If true, the plugin lists TCP connections |
| printUDP | Boolean | If true, the plugin lists UDP connections |
| Evaluation Criteria | | |
| op | String | Value is "list" |
| transport | String | Either "UDP" or "TCP" |
| ipVersion | Integer | Either 4 for IPv4 or 6 for IPv6 |
| local address | String | IP address of local interface |
| local port | Integer | Port number on local interface |
| remote address | String | IP address of remote interface |
| remote_port | Integer | Port number on remote interface |
| state | String | Indicates the current connection state (e.g., listening, connected, etc.) |

Example possible values for the state field are: UNKNOWN, CLOSED, LISTENING, SYN_SENT, SYN_RECEIVED, ESTABLISHED, FIN_WAIT1, FIN_WAIT2, CLOSE_WAIT, CLOSING, LAST_ACK, TIME_WAIT, DELETE_TCB

Network Connection Monitor

TABLE 7

NETWORK CONNECTION MONITOR

| | | |
|---|---|---|
| Supported Platforms | Windows | Linux 32-bit, 64-bit |
| Options | | |
| TCP Flag | Boolean | If true, monitors TCP connections. |
| UDP Flag | Boolean | If true, monitors UDP connections |
| TCP State | String | A specific TCP state to monitor |
| Port Number | Integer | Port number to monitor |
| Evaluation Criteria | | |
| op | String | Value is "list" |
| transport | String | Either "UDP" or "TCP" |
| ipVersion | Integer | Either 4 for IPv4 or 6 for IPv6 |
| local address | String | IP address of local interface |
| local_port | Integer | Port number on local interface |
| remote address | String | IP address of remote interface |
| remote_port | Integer | Port number on remote interface |
| state | String | Indicates the current connection state (e.g., listening, connected, etc.) |

Example possible values for the state field are: UNKNOWN, CLOSED, LISTENING, SYN_SENT, SYN_RECEIVED, ESTABLISHED, FIN_WAIT1, FIN_WAIT2, CLOSE_WAIT, CLOSING, LAST_ACK, TIME_WAIT, DELETE_TCB Process List
    Lists currently running processes

TABLE 8

| PROCESS LIST | | |
|---|---|---|
| Supported Platforms | Windows | Linux 32-bit, 64-bit |
| Options | | |
| Regex Filter | Regular expression | A regular expression to filter the process list. Default: * |
| Evaluation Criteria | | |
| op | String | "list" |
| pid | Integer | Process identifier |
| cmd | String | Command executed |
| owner | String | Account name that started (or "owns") the process |
| creation_time | String | Operating system timestamp indicating when the process started |

Program List
    This plugin lists installed applications.

TABLE 9

| PROGRAM LIST | | |
|---|---|---|
| Supported Platforms | Windows | |
| Options | | |
| This plugin has no configurable options. | | |
| Evaluation Criteria | | |
| Value | String | The name of the installed application |

Registry Monitor
    This plugin reports when changes are made to the Windows registry. Specifically, it reports changes made values under a specific key. It does not report changes made to subkeys.

TABLE 10

| REGISTRY MONITOR | | |
|---|---|---|
| Supported Platforms | Windows | |
| Options | | |
| Key | String | Full registry path to the key that is being monitored |
| Evaluation Criteria | | |
| key | String | Full path to the key being monitored |
| value | String | Name of the registry key value that has been changed |
| op | String | Either "modified", "renamed", "added", "removed", or "found" |
| newvalue | String | If op is 'renamed', this field specified the new name of the value |

Remote Port Monitor
    This plugin checks for open network ports on remote computers. The plugin attempts to establish a network connection to a remote computer on a specified port. Examples of how this plugin can be used include checking if services (e.g., web or ssh servers) are (or are not) running or if a firewall is configured properly.

TABLE 11

| REMOTE PORT MONITOR | | |
|---|---|---|
| Supported Platforms | Windows | Linux 32-bit, 64-bit |
| Options | | |
| Remote IP | String | IP address of remote host |
| Port Number | Integer | Port number on remote host to connect to |
| Check Interval | Integer | Interval (in seconds) to check for a connection |
| Randomize Interval | Boolean | If true, the plugin checks for connections at random times between 0 seconds and the user-specified interval |
| Evaluation Criteria | | |
| op | String | Either "open" or "closed" |
| port_number | Integer | The port number being monitored |

User Sessions
    This plugin monitors active user sessions (e.g., looks for currently logged-on users).

TABLE 12

| USER SESSIONS | | |
|---|---|---|
| Supported Platforms | Windows | Linux 32-bit, 64-bit |
| Options | | |
| List | Boolean | If true, lists all active user sessions and exits |
| User | String | Username to monitor |
| Interval | Integer | Frequency in seconds to check user sessions. Default: 5 seconds |
| Evaluation Criteria | | |
| op | String | Either "logon" or "logoff" |
| username | String | The username being monitored |
| Time | String | Operating system time stamp that the event occurred (or was detected) |

Web Page Search
    This plugin attempts to retrieve a web page from a remote server. It optionally can search the returned data for a user-specified regular expression. This plugin may require libcurl and libpere to be installed on the target system (e.g., the computer that the plugin will be running on.)

TABLE 13

| WEB PAGE SEARCH | | |
|---|---|---|
| Supported Platforms | Linux 32-bit, 64-bit | |
| Options: | | |
| url | String | The Uniform Resource Location (URL) to retrieve |
| Regular Expression | Regular expression | A regular expression to apply to the webpage (if it is retrieved) |
| Retry | Boolean | If true, the plugin continues trying to retrieve the webpage |
| Retry Interval | Integer | Number of seconds to wait between retries. Default: 30 seconds. |

TABLE 13-continued

WEB PAGE SEARCH

Supported Platforms  Linux 32-bit, 64-bit

Evaluation Criteria

| | | |
|---|---|---|
| url | String | The URL retrieved from the server |
| regexp | String | The regular expression use in the search |
| status | String | Either "found" or "not found" |

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processing units (e.g., processors) to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processing units (e.g., processors), such as one or more digital signal processors (DSPs), general purpose microprocessors, application specific integrated circuits (ASICs), field programmable logic arrays (FPGAs), or other equivalent integrated or discrete logic circuitry. Accordingly, the term "processing unit" or "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processing units as described above, in conjunction with suitable software and/or firmware.

It is to be recognized that, depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processing units, rather than sequentially.

In some examples, a computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:
1. A method comprising:
deploying, by a training system and on one or more virtual machines in a network, one or more training environments that are configured to execute one or more training exercises, wherein the training system comprises one or more modular systems that provide respective functionalities for configuring the one or more training exercises;
deploying, by the training system and for execution by one or more remote host computing systems that are communicatively coupled to the network, one or more software agents that are executed during the one or more training exercises, wherein the one or more software agents are configured to collect parameter data from the one or more remote host computing systems while one or more trainees perform actions during the one or more training exercises,
wherein the one or more software agents dynamically provide, during the deployment of the one or more software agents, one or more software tools to enable the collection of the parameter data from the one or more remote host computing systems while the one or more trainees perform actions during the one or more training exercises; and
receiving, by the training system and from the one or more remote host computing system via the network, the parameter data collected by the one or more software agents during execution of the one or more training exercises.
2. The method of claim 1, further comprising:
determining, by the training system and based on the parameter data, that one or more skills have been demonstrated by the one or more trainees during the one or more training exercises; and responsive to determining that the one or more skills have been demonstrated, outputting, for display by the training system, one or more skill nodes to graphically indicate that the one or more skills have been demonstrated by the one or more trainees during the one or more training exercises, wherein the one or more skill nodes represent one or more skills to be demonstrated by the one or more trainees during the one or more training exercises.

3. The method of claim 1, wherein the one or more training exercises are multi-unit training exercises.

4. The method of claim 1,
wherein the one or more training environments comprises a first one or more training environments,
wherein deploying the one or more training environments comprises deploying the one or more virtual machines having the first one or more training environments to a second one or more training environments remote to the network.

5. The method of claim 4, wherein the second one or more training environments remote to the network include a physical network, a virtual network, or a combined virtual and hardware-based network.

6. The method of claim 1, wherein the network comprises at least one of a virtual network, a hardware-based network, or a combined virtual and hardware-based network.

7. The method of claim 1, wherein the one or more virtual machines are executed on the one or more remote host computing systems.

8. The method of claim 1, further comprising:
executing, by the training system, one or more systems of the training system that provide different functionality for configuring the one or more training environments;
deploying, by the training system, the one or more systems of the training system to a remote training environment; and
wherein the one or more modular systems includes at least a learning management modular system, a scenario modular system, and an assessment modular system,
wherein the learning management modular system deploys the one or more training environments on one or more virtual machines,
wherein the scenario modular system deploys the one or more training exercises and the one or more software agents that are executed during the one or more training exercises, and
wherein the assessment modular system evaluates the parameter data collected from the one or more remote host computing systems while the one or more trainees perform actions during the one or more training exercises.

9. A training system, comprising:
one or more memories;
one or more hardware-based processors; and
at least one virtual machine for providing one or more training environments;
wherein the one or more hardware-based processors configured to:
deploy the one or more training environments to one or more remote host computing systems;
deploy one or more training exercises in the one or more training environments and deploy one or more software agents that are executed during the one or more training exercises, wherein the one or more software agents are configured to collect parameter data from the one or more remote host computing systems while the one or more trainees perform actions during the one or more training exercises, wherein the one or more software agents dynamically provide, during the deployment of the one or more software agents, one or more software tools to enable the collection of the parameter data from the one or more remote host computing systems while the one or more trainees perform actions during the one or more training exercises; and
evaluate the parameter data collected from the one or more remote host computing systems while the one or more trainees perform actions during the one or more training exercises.

10. The training system of claim 9, wherein, to deploy the one or more training environments to one or more remote host computing systems, the one or more hardware-based processors further configured to:
generate one or more course materials for the one or more training exercises.

11. The training system of claim 9, wherein, to deploy the one or more training exercises in the one or more training environments and deploy one or more software agents that are executed during the one or more training exercises, the one or more hardware-based processors further configured to:
configure a network for the one or more training environments; and
deploy the one or more software agents to the one or more training environments.

12. The training system of claim 11, wherein the network comprises at least one of a virtual network, a hardware-based network, or a combined virtual and hardware-based network.

13. A non-transitory computer-readable storage medium comprising instructions that, when executed, cause one or more processors to perform operations comprising:
deploying, on one or more virtual machines in a network, one or more training environments that are configured to execute one or more training exercises;
deploying, for execution by one or more remote host computing systems that are communicatively coupled to the network, one or more software agents that are executed during the one or more training exercises, wherein the one or more software agents are configured to collect parameter data from the one or more remote host computing systems while the one or more trainees perform actions during the one or more training exercises, wherein the one or more software agents dynamically provide, during the deployment of the one or more software agents, one or more software tools to enable the collection of the parameter data from the one or more remote host computing systems while the one or more trainees perform actions during the one or more training exercises; and
receiving the parameter data collected by the one or more software agents during execution of the one or more training exercises.

14. The non-transitory computer-readable storage medium of claim 13, wherein the operations further comprise:
determining, based on the parameter data, that one or more skills have been demonstrated by the one or more trainees during the one or more training exercises; and
responsive to determining that the one or more skills have been demonstrated, updating, for display, the one or more skill nodes to graphically indicate that the one or more skills have been demonstrated by the one or more trainees during the one or more training exercises.

15. The non-transitory computer-readable storage medium of claim 13, wherein the one or more training exercises are multi-unit training exercises.

16. The non-transitory computer-readable storage medium of claim 13,
wherein the one or more training environments comprises a first one or more training environments,
wherein deploying the one or more training environments comprises deploying the one or more virtual machines having the first one or more training environments to a second one or more training environments remote to the network.

17. The non-transitory computer-readable storage medium of claim 16, wherein the second one or more training environments remote to the network comprises a physical network, a virtual network, or a combined virtual and hardware-based network.

18. The non-transitory computer-readable storage medium of claim 13, wherein the network comprises at least one of a virtual network, a hardware-based network, or a combined virtual and hardware-based network.

19. The non-transitory computer-readable storage medium of claim 13, wherein the operations further comprise:
executing one or more systems of the modular training system that provide different functionality for configuring the one or more training environments;
deploying the one or more systems of the modular training system to a remote training environment; and
wherein the one or more systems includes operations for:
deploying one or more training environments on one or more virtual machines,
deploying one or more training exercises and one or more software agents that are executed during the one or more training exercises, wherein the one or more software agents are configured to collect parameter data from the one or more remote host computing systems while the one or more trainees perform actions during the one or more training exercises, and
evaluating the parameter data collected from the one or more remote host computing systems while the one or more trainees perform actions during the one or more training exercises.

* * * * *